US 007724827B2

(12) United States Patent
Liang et al.

(10) Patent No.: US 7,724,827 B2
(45) Date of Patent: May 25, 2010

(54) MULTI-LAYER RUN LEVEL ENCODING AND DECODING

(75) Inventors: Jie Liang, Coquitlam (CA); Chih-Lung Lin, Redmond, WA (US); Shankar Regunathan, Bellevue, WA (US); Sridhar Srinivasan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1287 days.

(21) Appl. No.: 10/826,971

(22) Filed: Apr. 15, 2004

(65) Prior Publication Data

US 2005/0052294 A1  Mar. 10, 2005

Related U.S. Application Data

(60) Provisional application No. 60/501,081, filed on Sep. 7, 2003.

(51) Int. Cl.
*H03M 7/44* (2006.01)
*H03M 7/40* (2006.01)
*H03M 7/48* (2006.01)
*H04N 7/26* (2006.01)
*H03M 7/46* (2006.01)

(52) U.S. Cl. .............. 375/240.23; 341/59; 341/63; 341/65; 341/67; 358/426.13; 382/244; 382/245; 382/246

(58) Field of Classification Search .......... 375/240.23; 341/63, 65, 67; 382/244, 245, 246
See application file for complete search history.

(56) References Cited

U.S. PATENT DOCUMENTS 4,420,771 A   12/1983  Pirsch
4,698,672 A   10/1987  Chen
4,792,981 A   12/1988  Cahill et al.

(Continued)

FOREIGN PATENT DOCUMENTS

EP   0540350   5/1993

(Continued)

OTHER PUBLICATIONS

Gailly, J. L. "comp.compression Frequently Asked Questions" [online]. FAQs.org, Sep. 1999 [retrived on Sep. 5, 2007]. Retrieved from the Internet: <URL: http://www.faqs.org/faqs/compression-faq/part1/>.*

(Continued)

*Primary Examiner*—Mehrdad Dastouri
*Assistant Examiner*—David N Werner
(74) *Attorney, Agent, or Firm*—Klarquist Sparkman, LLP

(57) ABSTRACT

Entropy coding and decoding techniques are described, which may be implemented separately or in combination. For example, a video encoder uses two-layer run level coding to reduce bitrate for frequency transform coefficients in a quick and efficient manner, and a video decoder uses corresponding two-layer run level decoding. This two-layer coding/decoding can be generalized to more than two layers of run level coding/decoding. The video encoder and decoder exploit common patterns in run level information to reduce code table size and create opportunities for early termination of decoding. Using zoned Huffman code tables helps limit overall table size while still providing a level of adaptivity in encoding and decoding. Using embedded Huffman code tables allows the encoder and decoder to reuse codes for 8×8, 8×4, 4×8, and 4×4 blocks.

52 Claims, 32 Drawing Sheets

U.S. PATENT DOCUMENTS

| | | | |
|---|---|---|---|
| 4,813,056 A | 3/1989 | Fedele | |
| 4,901,075 A | 2/1990 | Vogel | |
| 4,968,135 A | 11/1990 | Wallace et al. | |
| 5,040,217 A | 8/1991 | Brandenburg et al. | |
| 5,043,919 A | 8/1991 | Callaway et al. | |
| 5,045,938 A | 9/1991 | Sugiyama | |
| 5,089,818 A | 2/1992 | Mahieux et al. | |
| 5,128,758 A | 7/1992 | Azadegan | |
| 5,146,324 A | 9/1992 | Miller et al. | |
| 5,179,442 A | 1/1993 | Azadegan | |
| 5,227,788 A | 7/1993 | Johnston | |
| 5,227,878 A | 7/1993 | Puri et al. | |
| 5,266,941 A | 11/1993 | Akeley et al. | |
| 5,381,144 A * | 1/1995 | Wilson et al. | 341/63 |
| 5,394,170 A | 2/1995 | Akeley et al. | |
| 5,400,075 A | 3/1995 | Savatier | |
| 5,457,495 A | 10/1995 | Hartung | |
| 5,461,421 A | 10/1995 | Moon | |
| 5,467,134 A | 11/1995 | Laney et al. | |
| 5,481,553 A | 1/1996 | Suzuki | |
| 5,493,407 A | 2/1996 | Takahara | |
| 5,504,591 A | 4/1996 | Dujari | |
| 5,533,140 A | 7/1996 | Sirat et al. | |
| 5,544,286 A | 8/1996 | Laney | |
| 5,559,557 A | 9/1996 | Kato et al. | |
| 5,568,167 A | 10/1996 | Galbi et al. | |
| 5,574,449 A | 11/1996 | Golin | |
| 5,579,430 A | 11/1996 | Grill et al. | |
| 5,640,420 A * | 6/1997 | Jung | 375/240 |
| 5,654,706 A | 8/1997 | Jeong et al. | |
| 5,661,755 A | 8/1997 | Van de Kerkhof | |
| 5,668,547 A * | 9/1997 | Lee | 341/63 |
| 5,706,001 A | 1/1998 | Sohn | |
| 5,717,821 A | 2/1998 | Tsutsui | |
| 5,748,789 A | 5/1998 | Lee et al. | |
| 5,819,215 A | 10/1998 | Dobson et al. | |
| 5,825,830 A | 10/1998 | Kopf | |
| 5,828,426 A | 10/1998 | Yu | |
| 5,835,144 A | 11/1998 | Matsumura | |
| 5,883,633 A | 3/1999 | Gill et al. | |
| 5,884,269 A | 3/1999 | Cellier et al. | |
| 5,946,043 A | 8/1999 | Lee et al. | |
| 5,956,686 A | 9/1999 | Takashima et al. | |
| 5,969,650 A | 10/1999 | Wilson et al. | |
| 5,974,184 A | 10/1999 | Eifrig et al. | |
| 5,982,437 A | 11/1999 | Okazaki | |
| 5,990,960 A | 11/1999 | Murakami | |
| 5,991,451 A | 11/1999 | Keith et al. | |
| 5,995,670 A | 11/1999 | Zabinsky | |
| 6,002,439 A | 12/1999 | Murakami | |
| 6,049,630 A | 4/2000 | Wang et al. | |
| 6,054,943 A | 4/2000 | Lawrence | |
| 6,078,691 A | 6/2000 | Luttmer | |
| 6,097,759 A | 8/2000 | Murakami | |
| 6,100,825 A | 8/2000 | Sedluk | |
| 6,111,914 A | 8/2000 | Bist | |
| 6,148,109 A | 11/2000 | Boon | |
| 6,154,572 A | 11/2000 | Chaddha | |
| 6,205,256 B1 | 3/2001 | Chaddha | |
| 6,215,910 B1 | 4/2001 | Chaddha | |
| 6,223,162 B1 | 4/2001 | Chen et al. | |
| 6,226,407 B1 | 5/2001 | Zabih et al. | |
| 6,233,017 B1 | 5/2001 | Chaddha | |
| 6,253,165 B1 | 6/2001 | Malvar | |
| 6,256,064 B1 * | 7/2001 | Chujoh et al. | 375/240.23 |
| 6,259,810 B1 | 7/2001 | Gill et al. | |
| 6,272,175 B1 | 8/2001 | Sriram et al. | |
| 6,292,588 B1 | 9/2001 | Shen | |
| 6,300,888 B1 | 10/2001 | Chen et al. | |
| 6,304,928 B1 | 10/2001 | Mairs et al. | |
| 6,337,881 B1 | 1/2002 | Chaddha | |
| 6,341,165 B1 | 1/2002 | Gbur | |
| 6,345,123 B1 | 2/2002 | Boon | |
| 6,349,152 B1 | 2/2002 | Chaddha | |
| 6,360,019 B1 | 3/2002 | Chaddha | |
| 6,377,930 B1 | 4/2002 | Chen et al. | |
| 6,392,705 B1 | 5/2002 | Chaddha | |
| 6,404,931 B1 | 6/2002 | Chen et al. | |
| 6,420,980 B1 | 7/2002 | Ejima | |
| 6,421,738 B1 | 7/2002 | Ratan et al. | |
| 6,441,755 B1 | 8/2002 | Dietz et al. | |
| 6,477,280 B1 | 11/2002 | Malvar | |
| 6,493,385 B1 | 12/2002 | Sekiguchi et al. | |
| 6,499,010 B1 | 12/2002 | Faller | |
| 6,542,631 B1 | 4/2003 | Ishikawa | |
| 6,542,863 B1 | 4/2003 | Surucu | |
| 6,573,915 B1 | 6/2003 | Sivan et al. | |
| 6,600,872 B1 | 7/2003 | Yamamoto | |
| 6,611,798 B2 | 8/2003 | Bruhn et al. | |
| 6,646,578 B1 | 11/2003 | Au | |
| 6,678,419 B1 | 1/2004 | Malvar | |
| 6,680,972 B1 | 1/2004 | Liljeryd et al. | |
| 6,690,307 B2 | 2/2004 | Karczewicz | |
| 6,704,705 B1 | 3/2004 | Kabal et al. | |
| 6,721,700 B1 | 4/2004 | Yin | |
| 6,728,317 B1 | 4/2004 | Demos | |
| 6,766,293 B1 | 7/2004 | Herre | |
| 6,771,777 B1 | 8/2004 | Gbur | |
| 6,795,584 B2 | 9/2004 | Karczewicz et al. | |
| 6,825,847 B1 | 11/2004 | Molnar et al. | |
| 6,947,886 B2 | 9/2005 | Rose et al. | |
| 6,957,157 B2 * | 10/2005 | Lander | 702/56 |
| 6,975,254 B1 | 12/2005 | Sperschneider et al. | |
| 7,016,547 B1 | 3/2006 | Smirnov | |
| 2002/0076115 A1 | 6/2002 | Leeder et al. | |
| 2003/0138150 A1 | 7/2003 | Srinivasan | |
| 2003/0147561 A1 * | 8/2003 | Faibish et al. | 382/245 |
| 2003/0156648 A1 | 8/2003 | Holcomb et al. | |
| 2003/0202601 A1 | 10/2003 | Bjontegaard et al. | |
| 2003/0225576 A1 | 12/2003 | Li et al. | |
| 2004/0044534 A1 | 3/2004 | Chen et al. | |
| 2004/0049379 A1 | 3/2004 | Thumpudi et al. | |
| 2004/0136457 A1 | 7/2004 | Funnell et al. | |
| 2005/0015249 A1 | 1/2005 | Mehrotra et al. | |
| 2005/0041874 A1 * | 2/2005 | Langelaar et al. | 382/233 |
| 2007/0172071 A1 | 7/2007 | Mehrotra et al. | |
| 2007/0174062 A1 | 7/2007 | Mehrotra et al. | |

FOREIGN PATENT DOCUMENTS

| | | |
|---|---|---|
| EP | 0910927 | 1/1998 |
| EP | 0966793 | 9/1998 |
| EP | 0931386 | 1/1999 |
| EP | 1 142 130 | 4/2003 |
| EP | 1 142 129 | 6/2004 |
| GB | 2 372 918 | 9/2002 |
| JP | 5-292481 | 11/1993 |
| JP | 6-021830 | 1/1994 |
| JP | 6-217110 | 8/1994 |
| JP | 7-274171 | 10/1995 |
| JP | 2002 204170 | 7/2002 |
| WO | WO 98/00924 | 1/1998 |

OTHER PUBLICATIONS

Cui, C. et al. "A novel VLC based on second-run-level coding and dynamic truncation". Proceedings of SPIE—vol. 6077 Visual Communications and Image Processing 2006, Jan. 2006.*

Gibson et al., *Digital Compression for Multimedia*, Morgan Kaufmann, pp. 17-62, 1998.

ISO/IEC, "ISO/IEC 11172-2, Information technology—Coding of moving pictures and associated audio for digital storage media at up to about 1,5 Mbit/s—Part 2: Video," 112 pp. (1993).

ISO/IEC, "JTC1/SC29/WG11 N2202, Information Technology—Coding of Audio-Visual Objects: Visual, ISO/IEC 14496-2," 329 pp. (1998).

ITU-T, "ITU-T Recommendation H.261, Video Codec for Audiovisual Services at p x 64 kbits," 25 pp. (1993).

ITU-T, "ITU-T Recommendation H.262, Information Technology—Generic Coding of Moving Pictures and Associated Audio Information: Video," 205 pp. (1995).

ITU-T, "ITU-T Recommendation H.263, Video coding for low bit rate communication," 162 pp. (1998).

Joint Video Team (JVT) of ISO/IEC MPEG & ITU-T VCEG, "Draft ITU-T Recommendation and Final Draft International Standard of Joint Video Specification (ITU-T Rec. H.264 | ISO/IEC 14496-10 AVC)," 253 pp. (May 2003).

Nelson, *The Data Compression Book*, "Huffman One Better: Arithmetic Coding," Chapter 5, pp. 123-165 (1992).

U.S. Appl. No. 60/341,674, filed Dec. 17, 2001, Lee et al.

U.S. Appl. No. 60/488,710, filed Jul. 18, 2003, Srinivasan et al.

Brandenburg, "ASPEC Coding", *AES 10$^{th}$ International Conference*, pp. 81-90 (1991).

De Agostino et al., "Parallel Algorithms for Optimal Compression using Dictionaries with the Prefix Property," in *Proc. Data Compression Conference '92, IEEE Computer Society Press*, pp. 52-62 (1992).

Shamoon et al., "A Rapidly Adaptive Lossless Compression Algorithm for High Fidelity Audio Coding," *IEEE Data Compression Conf. 1994*, pp. 430-439 (Mar. 1994).

Reader, "History of MPEG Video Compression—Ver. 4.0," 99 pp., document marked Dec. 16, 2003.

Printouts of FTP directories from http://ftp3.itu.ch , 8 pp. (downloaded from the World Wide Web on Sep. 20, 2005.).

Microsoft Corporation, "Microsoft Debuts New Windows Media Player 9 Series, Redefining Digital Media on the PC," 4 pp. (Sep. 4, 2002) [Downloaded from the World Wide Web on Jul. 16, 2004].

Mook, "Next-Gen Windows Media Player Leaks to the Web," *BetaNews*, 18 pp. (Jul. 2002) [Downloaded from the World Wide Web on Mar. 16, 2004].

Wien et al., "16 Bit Adaptive Block size Transforms," JVT-C107r1, 54 pages.

Gill et al., "Creating High-Quality Content with Microsoft Windows Media Encoder 7," 4 pp. (2000) [Downloaded from the World Wide Web on May 1, 2002].

Ishii et al., "Parallel Variable Length Decoding with Inverse Quantization for Software MPEG-2 Decoders," IEEE Signal Processing Systems, pp. 500-509 (1997).

Jeong et al., "Adaptive Huffman Coding of 2-D DCT Coefficients for Image Sequence Compression," *Signal Processing: Image Communication*, vol. 7, 11 pp. (1995).

Joint Video Team (JVT) of ISO/IEC MPEG & ITU-T VCEG, "Joint Final Committee Draft (JFCD) of Joint Video Specification," JVT-D157, 207 pp. (Aug. 2002).

Sullivan et al., "The H.264/AVC Advanced Video Coding Standard: Overview and Introduction to the Fidelity Range Extensions," 21 pp. (Aug. 2004).

Tu et al., "Context-Based Entropy Coding of Block Transform Coefficients for Image Compression," *IEEE Transactions on Image Processing*, vol. 11, No. 11, pp. 1271-1283 (Nov. 2002).

Wien, "Variable Block-Size Transforms for Hybrid Video Coding," Dissertation, 182 pp. (Feb. 2004).

Hui et al., "Matsushita Algorithm for Coding of Moving Picture Information," ISO/IEC-JTC1/SC29/WG11, MPEG91/217, 76 pp. (Nov. 1991).

Costa et al., "Efficient Run-Length Encoding of Binary Sources with Unknown Statistics", Technical Report No. MSR-TR-2003-95, pp. 1-10, Microsoft Research, Microsoft Corporation (Dec. 2003).

ISO/IEC 14496-2, "Coding of Audio-Visual Object—Part 2: Visual," Third Edition, pp. 1-727, (Jun. 2004).

ITU-T Recommendation H.264, "Series H: Audiovisual and Multimedia Systems, Infrastructure of Audiovisual Services—Coding of Moving Video," International Telecommunication Union, pp. 1-262 (May 2003).

ITU-T Recommendation T.800, "Series T: Terminals for Telematic Services," International Telecommunication Union, pp. 1-194 (Aug. 2002).

Malvar, "Fast Progressive Image Coding without Wavelets", IEEE Data Compression Conference, Snowbird, Utah, 10 pp. (Mar. 2000).

Search Report and Written Opinion of PCT/US06/30308 dated Oct. 23, 2007.

Bosi et al., "ISO/IEC MPEG-2 Advance Audio Coding," J. Audio Eng. Soc., vol. 45, No. 10, pp. 789-812 (Sep. 1997).

Chung et al., "A Novel Memory-efficient Huffman Decoding Algorithm and its Implementation," Signal Processing 62, pp. 207-213 (Oct. 1997).

Lee, "Wavelet Filter Banks in Perceptual Audio Coding," Thesis presented to the University of Waterloo, 144 pages (month unknown, 2003).

Novak et al., "Spectral Band Replication and aacPlus Coding—An Overview," TLC Corp., 2 pages (month unknown, 2003).

Painter et al., "A Review of Algorithms for Perceptual Coding of Digital Audio Signals," 13th International Conference on Digital Signal Processing Proceedings, 30 pages (Jul. 1997).

* cited by examiner

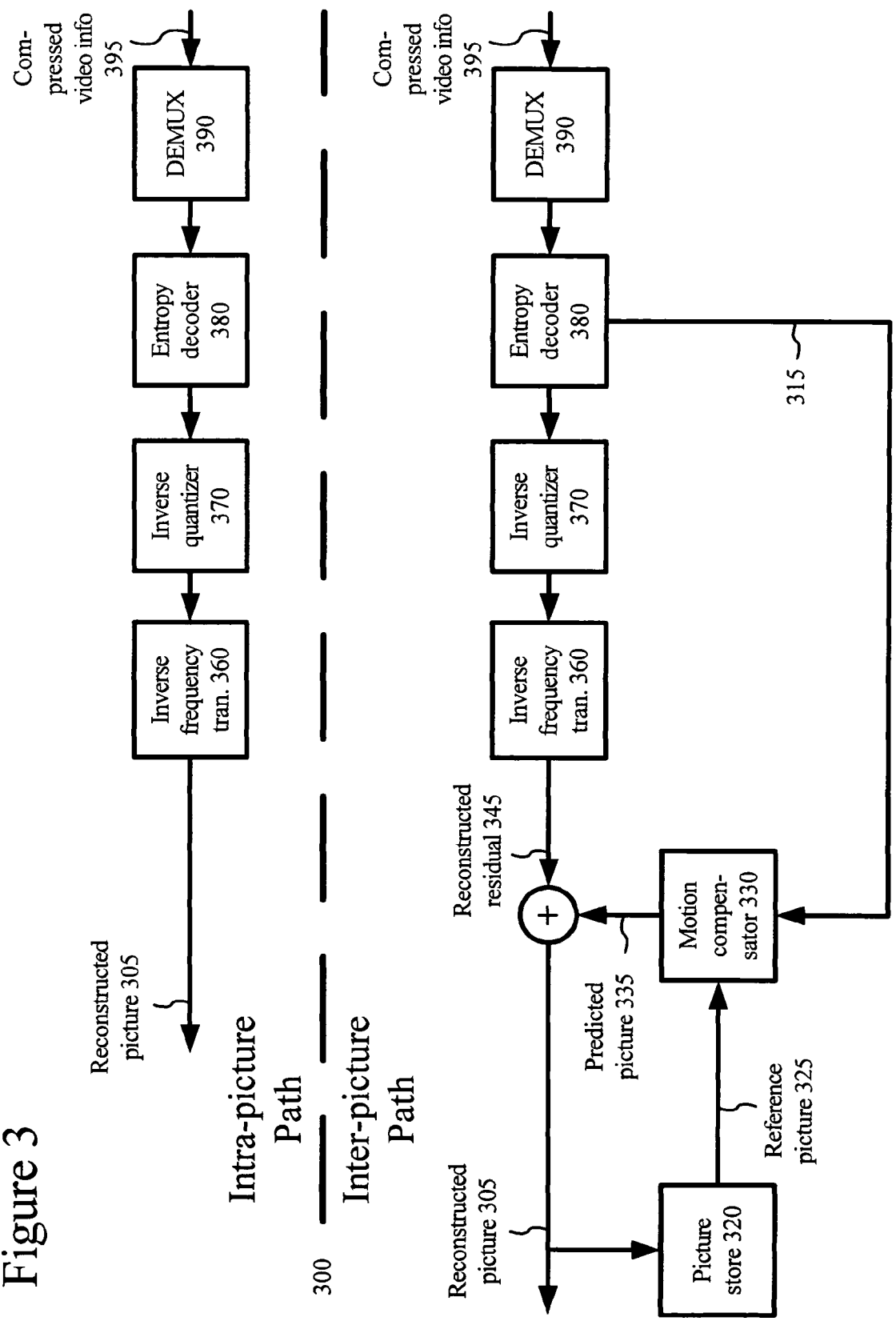

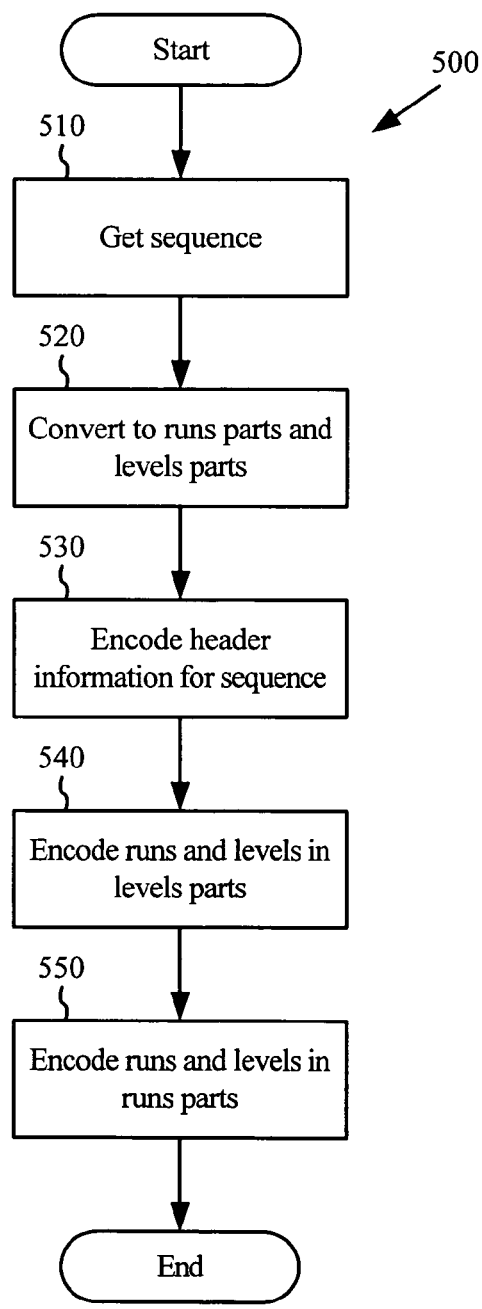
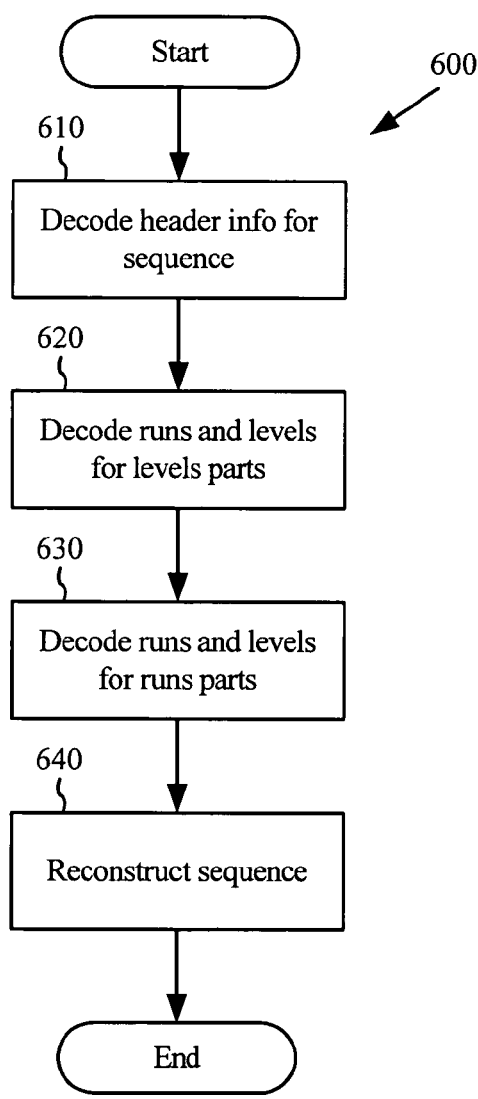

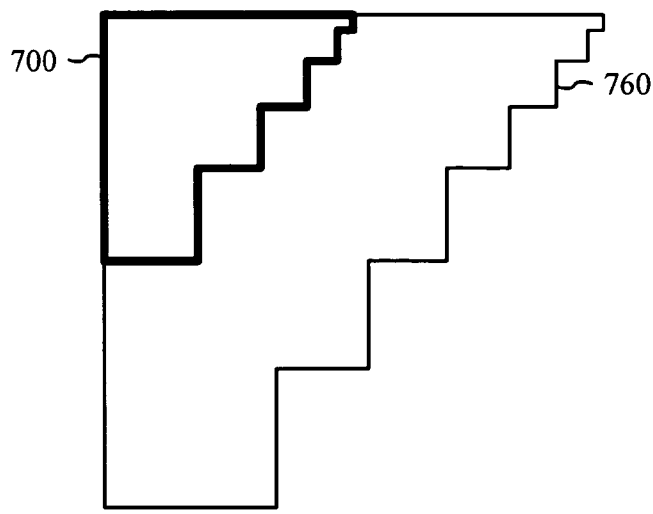
Figure 7a
Figure 7b
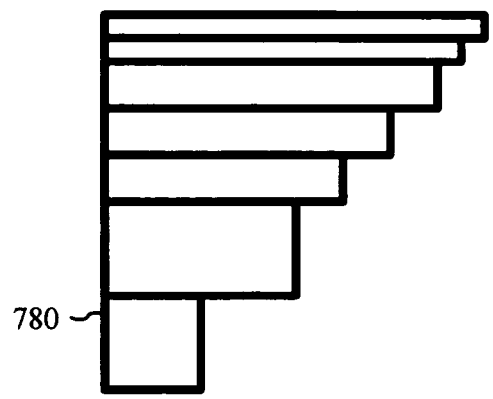
Figure 7c

Figure 12
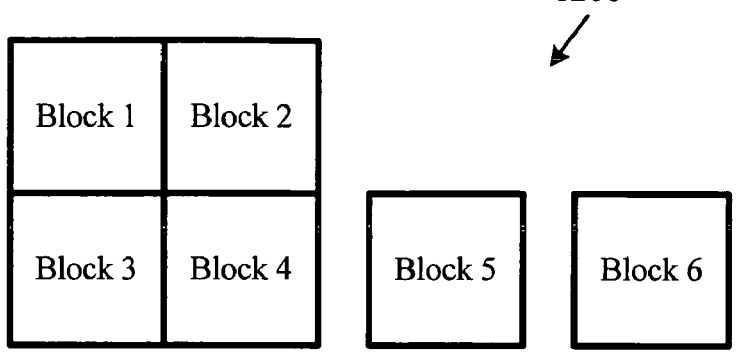
Figure 13a
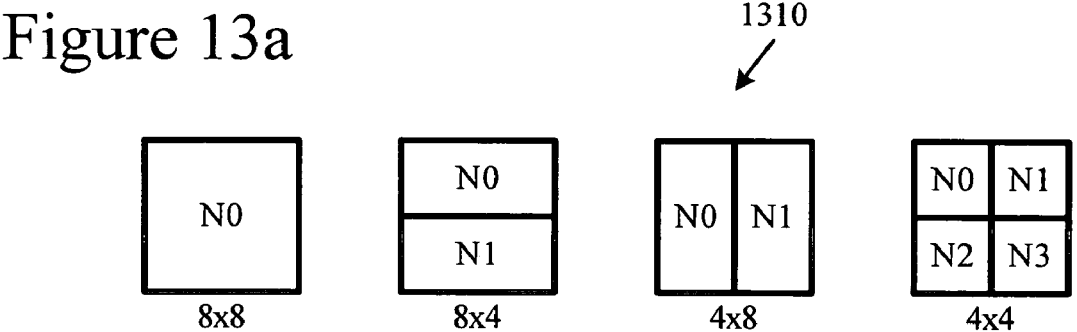
Figure 13b
| Current block | Neighbor in 8x8 mode | Neighbor in 8x4 mode | Neighbor in 4x8 mode | Neighbor in 4x4 mode |
|---|---|---|---|---|
| 8x8 | N0 | N0 + N1 | N0 + N1 | N0+N1+N2+N3 |
| 8x4 top | (N0 + 1) / 2 | N1 | (N0+N1+1) / 2 | N2 + N3 |
| 8x4 bottom | Impossible | N0 | Impossible | Impossible |
| 4x8 left | (N0 + 1) / 2 | (N0+N1+1) / 2 | N0 | N0 + N2 |
| 4x8 right | (N0 + 1) / 2 | (N0+N1+1) / 2 | N1 | N1 + N3 |
| 4x4 No. 0 | (N0 + 2) / 4 | (N1 + 1) / 2 | (N0 + 1) / 2 | N2 |
| 4x4 No. 1 | (N0 + 2) / 4 | (N1 + 1) / 2 | (N1 + 1) / 2 | N3 |
| 4x4 No. 2 | Impossible | Impossible | Impossible | N0 |
| 4x4 No. 3 | Impossible | Impossible | Impossible | N1 |

| Current Sub-block | Neighbor in 8x8 mode | Neighbor in 8x4 mode | Neighbor in 4x8 mode | Neighbor in 4x4 mode |
|---|---|---|---|---|
| 8x8 | N0 | N0 + N1 | N0 + N1 | N0+N1+N2+N3 |
| 8x4 top | (N0 + 1) / 2 | N0 | (N0+N1+1) /2 | N0+N1 |
| 8x4 bottom | (N0 + 1) / 2 | N1 | (N0+N1+1) /2 | N2+N3 |
| 4x8 left | (N0 + 1) / 2 | (N0+N1+1) /2 | N1 | N1+N3 |
| 4x8 right | Impossible | Impossible | N0 | Impossible |
| 4x4 No. 0 | (N0 + 2) / 4 | (N0+1) / 2 | (N1+1)/2 | N1 |
| 4x4 No. 1 | Impossible | Impossible | Impossible | N0 |
| 4x4 No. 2 | (N0 + 2) / 4 | (N1+1) / 2 | (N1+1) / 2 | N3 |
| 4x4 No. 3 | Impossible | Impossible | Impossible | N2 |

| Block Mode | Context 0 Threshold | Context 1 Threshold | Context 2 Threshold | Context 3 Threshold | Context 4 Threshold | Context 5 Threshold |
|---|---|---|---|---|---|---|
| 8x8 | 1 | 3 | 5 | 7 | 16 | 64 |
| 8x4/4x8 | 1 | 3 | 5 | 7 | 12 | 32 |
| 4x4 | 1 | 3 | 5 | 7 | 16 | -- |
| Intra | 2 | 6 | 12 | 24 | 63 | -- |

Context = 0;

While (Context < MaxContext[BlkMode] – 1 &&
        PredNumCoef > ContextThresholds_NUMCOEF[BlkMode][Context] )
    { Context ++; }

Figure 15                    1500

| Block Mode | Context 0 Threshold | Context 1 Threshold | Context 2 Threshold | Context 3 Threshold |
|---|---|---|---|---|
| 8x8 | 1 | 4 | 12 | 64 |
| 8x4/4x8 | 1 | 4 | 8 | 32 |
| 4x4 | 1 | 3 | 6 | 16 |
| Intra | 6 | 18 | 63 | -- |

Figure 16a                   1600

```
PredNumCoef = GetPredNumCoef();
Context = GetContext_NUMCOEF(PredNumCoef);
Index = vlc_decode(HufPtr_NUMCOEF[BlkMode][Context]);
if (Index <= 3) {
    NUMCOEF = Index + 1;
    ISLONLY = TRUE;   // the absolute values of all nonzero coefficients are equal to 1.
} else {
    ISLONLY = FALSE;
    if ((BlockMode is not 4x4) && (Index == 4 + BlockSize / 2) ) {
       // the last symbol in each context is escape symbol
       EscBits = (BlockMode == 8x8) ? 5 : 4;
       EscIndex = get_bits (EscBits);
       NUMCOEF = EscIndex + BlockSize / 2 + 1; }
    else { NUMCOEF = Index – 3; }
}
```

```
PredNumCoef = GetPredNumCoef();
Context = GetContext_NUMCOEF_Intra (PredNumCoef);
Index = vlc_decode (HufPtr_NUMCOEF_Intra[Context] );
if (Index <= 3) {
    NUMCOEF = Index + 1;
    ISLONLY = TRUE;
} else {
    ISLONLY = FALSE;
    if ( Index == 35 ) {
        NUMCOEF = 32 + get_bits(5);
    } else { NUMCOEF = Index - 3; }
}
```

```
PredNumCoef = GetPredNumCoef();

Context = GetContext_NUMCOEF (PredNumCoef);

Index = vlc_decode (HufPtr_NUMCOEF[BlkMode][Context] );

if (Index >= BlockSize) {
   NUMCOEF = Index + 1 - BlockSize;
   ISLONLY = TRUE;
} else {
   NUMCOEF = Index + 1;
   ISLONLY = FALSE;
};
```

1800

| Block Mode | Context 0 Threshold | Context 1 Threshold |
|---|---|---|
| 8x8 | 16 | 64 |
| 8x4/4x8 | 8 | 32 |
| 4x4 | 4 | 16 |

1900

| Block Mode | Context 1 Threshold | Context 2 Threshold | Context 3 Threshold |
|---|---|---|---|
| 8x8 | 6 | 16 | 64 |
| 8x4/4x8 | 4 | 12 | 32 |
| 4x4 | 4 | 8 | 16 |

2000

| Block Mode | Number of Zones |
|---|---|
| 8x8 | 8 |
| 8x4/4x8 | 7 |
| 4x4 | 7 |
| Intra 8x8 | 8 |

2010

ZoneHeight_Inter_8x8 [2][8] = {
    {1, 1, 1, 1, 4, 4, 8, 43}, // context 0
    {1, 1, 2, 4, 4, 4, 8, 39}, // context 1
};
ZoneHeight_Inter_8x4_and_4x8 [2][7] = {
    {1, 1, 1, 1, 1, 4, 22}, // context 0
    {1, 1, 1, 1, 4, 8, 15}, // context 1
};
ZoneHeight_Inter_4x4 [2][7] = {
    {1, 1, 1, 1, 1, 2, 8}, // context 0
    {1, 1, 1, 1, 1, 4, 6}, // context 1
};
ZoneHeight_Intra_8x8 [8] =
    {1, 1, 1, 1, 4, 4, 8, 42};

Figure 21a 2100

| Block Mode | Number of Zones |
|---|---|
| 8x8 | 8 |
| 8x4/4x8 | 10 |
| 4x4 | 15 |
| Intra 8x8 | 8 |

Figure 21b 2110

ZoneHeight_Inter_8x8[3][8] = {
// 3 contexts, each has 8 zones
    {1, 1, 1, 1, 4, 8, 16, 31},
    {1, 1, 1, 1, 4, 8, 16, 31},
    {1, 1, 1, 1, 4, 8, 16, 31},
};
ZoneHeight_Inter_8x4_and_4x8[3][10] = {
    {1, 1, 1, 1, 1, 1, 1, 1, 8, 15},
    {1, 1, 1, 1, 1, 1, 1, 4, 5, 15},
    {1, 1, 1, 1, 1, 1, 2, 4, 4, 15},
  };
ZoneHeight_Intra_8x8[8] =
    {1, 1, 2, 2, 4, 8, 16, 28};

NUMZERO_EscThresholdLeft[2][8] = {
{0, 0, 0, 0, 0, 8, 16, 16},  // context 0
{0, 0, 12,12, 20, 20, 16, 16},  // context 1
};
NUMZERO_EscThresholdRight[2][8] = {
{32, 32, 32, 32, 32, 40, 48, 44},  // context 0
{32, 32, 44, 44, 52, 52, 48, 40},  // context 1
};
NUMZERO_EscThresholdLeft_Intra[8] =  {0, 0, 0, 0, 0, 4, 12, 16};
NUMZERO_EscThresholdRight_Intra[8] = {32, 32, 32, 32, 32, 36, 44, 43};

```
PredNumZero = GetPredNumZero();
Context = GetContext_NUMZERO(PredNumZero);
Zone = GetZone_NUMZERO(NUMCOEF);
ZoneHead = GetZoneHead_NUMZERO(NUMCOEF);
RightShift = NUMCOEF – ZoneHead;

index = vlc_decode (HufPtr_NUMZERO[BlkMode][Context][Zone]);
if (block mode is not 8x8) {
      NUMZERO = index - RightShift;
} else {
      // check escape symbol
      if (index > 0) {
            NUMZERO = index - 1 +
                  NUMZERO_EscThresholdLeft[Context][Zone] – RightShift;
      } else {
            EscIndex = get_bits (5);
            if (EscIndex < NUMZERO_EscThresholdLeft[Context][Zone]) {
               // left margin
               NUMZERO = EscIndex - RightShift;
            } else {
               // right margin
               NUMZERO  = EscIndex -
                  NUMZERO_EscThresholdLeft[Context][Zone] +
                  NUMZERO_EscThresholdRight[Context][Zone] - RightShift;
            }
      }
}
```

```
Zone = GetZone_NUMZERO_Intra(NUMCOEF);
ZoneHead = GetZoneHead_NUMZERO_Intra(NUMCOEF);
RightShift = NUMCOEF - ZoneHead;

index = vlc_decode(HufPtr_NUMZERO_Intra[Zone]);

if (index > 0) {
      NUMZERO = index - 1 + NUMZERO_EscThresholdLeft_Intra[Zone] - RightShift;
} else {
      EscIndex = get_bits (5);
      if (EscIndex < NUMZERO_EscThresholdLeft_Intra[Zone] ) {
         // left margin
         NUMZERO = EscIndex - RightShift;
      } else {
         // right margin
         NUMZERO  = EscIndex - NUMZERO_EscThresholdLeft_Intra[Zone] +
               NUMZERO_EscThresholdRight_Intra[Zone] - RightShift;
      }
}
```

```
PredNumZero = GetPredNumZero();

Context = 0;
If (BlkMode == INTER) {
    Context = GetContext_NUMZERO(PredNumZero);
}

Zone = GetZone_NUMZERO(NUMCOEF);

NUMZERO = vlc_decode (HufPtr_NUMZERO[BlkMode][Context][Zone]);
```

```
RUNISL1 = Decode_RUNISL1( );
if (NUMCOEF – RUNISL1 > 0) {
    //Function returns NUMSL and SingleTwoFound.
    Decode_NUMSL(&NUMSL, &SingleTwoFound);
    ISLLeft = NUMCOEF – RUNISL1 – NUMSL;

if (SingleTwoFound == FALSE) {
        LevelZone = 0;
        LevelThreshold[BlkMode] = IniLevelThreshold[BlkMode];
        ShiftLevel = (NUMSL == 1);
        for (n = NUMSL - 1; n >= 0; n--) {
            VALSL(n) = Decode_VALSL( );
            if (n > 0 && ISLLeft) {
                RUNISL(n) = Decode_RUNISL( );
                ISLLeft = ISLLeft - RUNISL(n);
            }
        }
    }
}
Decode_Signs( );
```

| NUMCOEF | RUNISL1=0 | RUNISL1 = 1 | RUNISL1 = 2 | RUNISL1 = 3 |
|---|---|---|---|---|
| 2 | 0 | 1 | -- | -- |
| 3 | 10 | 0 | 11 | -- |
| 4 | 00 | 01 | 10 | 11 |

```
If (ISLONLY == TRUE) {
    RUNISL1 = NUMCOEF;
} else {
    If (NUMCOEF == 1) {
        RUNISL1 = 0;
    } else {
        If (NUMCOEF <= 4)  {
            RUNISL1 = Vlc_decode ( HufPtr_RUNISL1_1[NUMCOEF - 2] );
        } else {
            Zone = GetZone_RUNISL1( NUMCOEF);
            index = vlc_decode ( HufPtr_RUNISL1_2 [Zone]);
            if ( Zone > 6 && index == 15 ) {
                RUNISL1= 15 + get_bits( 6 );
            } else {
                RUNISL1= index;
            }
        }
    }
}
```

```
If (ISLONLY == TRUE) {
    RUNISL1 = NUMCOEF;
} else {
    If (NUMCOEF == 1) {
        RUNISL1 = 0;
    } else {
        If (NUMCOEF <= 4) {
            RUNISL1 = Vlc_decode(HufPtr_RUNISL1_1[NUMCOEF - 2]);
        } else {
            Zone = GetZone_RUNISL1_Intra(NUMCOEF);
            index = Vlc_decode(HufPtr_RUNISL1_2_Intra[Zone]);
            if (index < 33) {
                RUNISL1 = index;
            } else {
                RUNISL1 = 33 + get_bits(5);
            }
        }
    }
}
```

```
If (NUMCOEF > 1) {
        If (NUMCOEF <= 4) {
                Index = Vlc_decode(HufPtr_RUNISL1_1[NUMCOEF - 2]);
        } else {
                Zone = GetZone_RUNISL1( NUMCOEF);

RUNISL1=Vlc_decode(HufPtr_RUNISL1_2[NUMCOEF_Context][Zone]);
        }
}
```

```
If (NUMCOEF > 1) {
        If (NUMCOEF <= 4) {
                Index = Vlc_decode(HufPtr_RUNISL1_1_Intra[NUMCOEF - 2]);
        } else {
                Zone = GetZone_RUNISL1_Intra( NUMCOEF);
                RUNISL1 = Vlc_decode(HufPtr_RUNISL1_2_Intra[Zone]);
        }
}
```

| NUMCOEF | RUNISL1=0 | RUNISL1 = 1 | RUNISL1 = 2 | RUNISL1 = 3 |
|---------|-----------|-------------|-------------|-------------|
| 2       | 0         | 1           | --          | --          |
| 3       | 10        | 0           | 11          | --          |
| 4       | 00        | 01          | 10          | 11          |

Figure 26d  2630
Figure 27a  2700
Figure 27b  2710
ZoneHeight_NUMSL[3][8] =
{
   {1, 1, 1, 1, 1, 1, 1, 57},
   {1, 1, 1, 1, 2, 4, 8, 46},
   {4, 4, 2, 2, 4, 4, 8, 36},
};

Figure 27c

2720

```
Context = GetContext_Level(NUMCOEF);
Zone = GetZone_NUMSL(NUMCOEF - RUNISL1);
index = vlc_decode (HufPtr_NUMSL[Context][Zone]);
if (index == 0) {
        SingleTwoFound = TRUE;
        NUMSL = 1;
} else {
        SingleTwoFound = FALSE;
        if (index < 33) {
                NUMSL = index;
        } else {
                NUMSL = 33 + get_bits(5);
        }
}
```

Figure 27d

2730

```
Zone = GetZone_NUMSL_Intra(NUMCOEF - RUNISL1);
index = vlc_decode (HufPtr_NUMSL_Intra[Zone]);
if (index == 0) {
        NUMSL = 1;
        SingleTwoFound = TRUE;
} else {
        NUMSL = index;
        SingleTwoFound = FALSE;
}
```

```
index = vlc_decode(HufPtr_VALSL[LevelZone]);
if (index < 30) {
        VALSL = index + 2;
} else {
        EscScale = 1;
        while (!get_bits(1)) {
                EscScale ++;
        }
        VALSL = EscScale * 32 + get_bits(5);
}
if (ShiftLevel == TRUE) {
    VALSL ++;
    ShiftLevel = FALSE;
}
if (VALSL > LevelThreshold[BlkMode] && LevelZone < 3) {
        LevelThreshold[BlkMode] = LevelThreshold[BlkMode]  * 2;
        LevelZone = LevelZone + 1;
}
```

```
Zone = GetZone_RUNISL(ISLLeft);
index = vlc_decode(HufPtr_RUNISL[Context][Zone]);
if (ISLLeft >= 32 && index == 32) {
    RUNISL = 32 + get_bits(5);
} else {
    RUNISL = index;
}
```

```
Zone = GetZone_RUNISL_Intra(ISLLeft);
index = vlc_decode(HufPtr_RUNISL_Intra[Zone]);
if (ISLLeft >= 32 && index == 32) {
    RUNISL = 32 + get_bits(5);
} else {
    RUNISL = index;
}
```

```
if (NUMZERO == 1) {
    NUMSR = 1;
} else {
    NUMSR = Decod_NUMSR( );
    Decode_VALSR( );
}
ISRLeft = NUMCOEF - NUMSR;
if (ISRLeft) {
    Decode_RUNISR( );
}
```

| Block Mode | Context 0 Threshold | Context 1 Threshold | Context 2 Threshold |
|---|---|---|---|
| 8x8 | 20 | 32 | 64 |
| 8x4/4x8 | 10 | 16 | 32 |
| 4x4 | 8 | 12 | 16 |

Context_NUMSR = GetContext_NUMSR (NUMZERO);
MaxNUMSR = min(NUMCOEF, NUMZERO);
Zone = GetZone_NUMSR(MaxNUMSR);
Index = vlc_decode(HufPtr_NUMSR[Context_NUMSR][Zone]);
NUMSR = index + 1;

Context_NUMSR = GetContext_NUMSR_Intra(NUMZERO);
MaxNUMSR = min(NUMCOEF, NUMZERO);
Zone = GetZone_NUMSR_Intra(MaxNUMSR);
Index = vlc_decode(HufPtr_NUMSR_Intra[Context_NUMSR][Zone]);
NUMSR = index + 1;

| Block Mode | Context 0 Threshold | Context 1 Threshold | Context 2 Threshold |
|---|---|---|---|
| 8x8 | 8 | 20 | 64 |
| 8x4/4x8 | 6 | 12 | 32 |
| 4x4 | 4 | 10 | 16 |

```
Context_VALSR = GetContext_VALSR(NUMCOEF);
SRSumLeft = NUMZERO;
MaxVALSR = SRSumLeft - NUMSR + 1;
for (SRLeft = NUMSR; SRLeft > 0; SRLeft --) {
    if (SRLeft == 1) {
        VALSR[0] = SRSumLeft;
        break;
    } else if (SRLeft == SRSumLeft) {
        // set all remaining SRs to 1.
        break;
    }
    Zone = GetZone_VALSR(MaxVALSR);
    Index = vlc_decode(HufPtr_VALSR[Context_VALSR][Zone]);
    if (MaxVALSR >= 33 && Index == 32) {
        VALSR[SRLeft - 1] = 33 + get_bits (5);
    } else {
        VALSR[SRLeft - 1] = Index + 1;
    }
    SRSumLeft = SRSumLeft - VALSR[SRLeft - 1];
    MaxVALSR = MaxVALSR - VALSR[SRLeft - 1] + 1;
}
```

```
Context_VALSR = GetContext_VALSR(NUMZERO);
MaxVALSR = SRSumLeft - NUMSR + 1;
for (SRLeft = NUMSR; SRLeft > 0; SRLeft--) {
        if (SRLeft == 1) {
                VALSR = SRSumLeft;
                // save VALSR
                break;
        } else if (SRLeft == SRSumLeft) {
                // set all remaining SRs to 1.
                break;
        }
        Zone = GetZone_VALSR(MaxVALSR);
        Index = vlc_decode(HufPtr_VALSR[Context_VALSR][Zone]);
        VALSR = index + 1;
        // save VALSR
        SRSumLeft = SRSumLeft - VALSR;
        MaxVALSR = MaxVALSR - VALSR + 1;
}
```

| Block Mode | Context 0 Threshold | Context 1 Threshold | Context 2 Threshold |
|---|---|---|---|
| 8x8 | 8 | 20 | 63 |
| 8x4/4x8 | 6 | 12 | 31 |
| 4x4 | 4 | 10 | 15 |

Figure 34b

3410

```
ISRLeft = NUMCOEF - NUMSR;
if (ISRLeft) {
        Context = getContext_RUNISR(NUMZERO);
        for (n = 0; n < NUMSR && ISRLeft > 0; n ++) {
            Zone = GetZone_RUNISR(ISRLeft);
             Index = vlc_decode(HufPtr_RUNISR[Context][Zone]);
              if (ISRLeft >= 32 && Index == 32) {
                RUNISR[n]= 32 + get_bits(5);
            } else {
                RUNISR[n]= Index;
            }
            ISRLeft = ISRLeft - RUNISR[n];
        }
}
```

Figure 35

3500

```
ISRLeft = NUMCOEF - NUMSR;
if (ISRLeft) {
        Context = getContext_RUNISR(NUMZERO);
        for (n = 0; n < NUMSR && ISRLeft > 0; n ++) {
            Zone = GetZone_RUNISR(ISRLeft);
            RUNISR[n] = vlc_decode(HufPtr_RUNISR[Context][Zone]);
            ISRLeft = ISRLeft - RUNISR[n];
        }
}
```

Figure 36a

| 0 | 2 | 3 | 9 | 10 | 21 | 22 | 36 |
|---|---|---|---|----|----|----|----|
| 1 | 4 | 8 | 11 | 20 | 23 | 35 | 37 |
| 5 | 7 | 12 | 19 | 24 | 34 | 38 | 49 |
| 6 | 13 | 18 | 25 | 33 | 39 | 48 | 50 |
| 14 | 16 | 26 | 32 | 40 | 47 | 51 | 58 |
| 15 | 27 | 31 | 41 | 46 | 52 | 57 | 59 |
| 17 | 29 | 42 | 44 | 53 | 55 | 60 | 62 |
| 28 | 30 | 43 | 45 | 54 | 56 | 61 | 63 |

3601

Normal Intra Block Scan Pattern

Figure 36b

| 0 | 1 | 3 | 4 | 10 | 11 | 22 | 23 |
|---|---|---|---|----|----|----|----|
| 2 | 5 | 9 | 12 | 21 | 24 | 36 | 37 |
| 6 | 8 | 13 | 20 | 25 | 35 | 38 | 48 |
| 7 | 14 | 19 | 26 | 34 | 39 | 47 | 49 |
| 15 | 18 | 27 | 33 | 40 | 46 | 50 | 57 |
| 16 | 28 | 32 | 41 | 45 | 51 | 56 | 58 |
| 17 | 30 | 42 | 44 | 52 | 55 | 59 | 62 |
| 29 | 31 | 43 | 53 | 54 | 60 | 61 | 63 |

3602

Horizontal Intra Block Scan Pattern

Figure 36c

| 0 | 3 | 8 | 9 | 20 | 21 | 34 | 35 |
|---|---|---|---|----|----|----|----|
| 1 | 7 | 10 | 19 | 22 | 33 | 36 | 49 |
| 2 | 11 | 18 | 23 | 32 | 37 | 48 | 50 |
| 4 | 12 | 17 | 24 | 31 | 38 | 47 | 51 |
| 5 | 16 | 25 | 30 | 39 | 46 | 52 | 57 |
| 6 | 15 | 29 | 40 | 45 | 53 | 56 | 58 |
| 13 | 26 | 28 | 41 | 44 | 55 | 59 | 62 |
| 14 | 27 | 42 | 43 | 54 | 60 | 61 | 63 |

3603

Vertical Intra Block Scan Pattern

| 0 | 2 | 3 | 9 | 10 | 23 | 24 | 38 |
|---|---|---|---|----|----|----|----|
| 1 | 4 | 8 | 11 | 22 | 25 | 37 | 39 |
| 5 | 7 | 12 | 21 | 26 | 36 | 40 | 51 |
| 6 | 13 | 20 | 27 | 35 | 41 | 50 | 52 |
| 14 | 19 | 28 | 34 | 42 | 49 | 53 | 60 |
| 15 | 18 | 33 | 43 | 48 | 54 | 59 | 61 |
| 16 | 29 | 32 | 44 | 47 | 55 | 58 | 62 |
| 17 | 30 | 31 | 45 | 46 | 56 | 57 | 63 |

8x8 Inter Block Scan Pattern for Progressive Content

| 0 | 2 | 4 | 7 | 10 | 14 | 21 | 27 |
|---|---|---|---|----|----|----|----|
| 1 | 5 | 6 | 11 | 13 | 17 | 24 | 29 |
| 3 | 9 | 12 | 15 | 18 | 22 | 25 | 30 |
| 8 | 16 | 19 | 20 | 23 | 26 | 28 | 31 |

8x4 Inter Block Scan Pattern for Progressive Content

| 0 | 1 | 3 | 13 |
|---|---|---|----|
| 2 | 4 | 8 | 17 |
| 5 | 6 | 11 | 24 |
| 7 | 10 | 15 | 26 |
| 9 | 14 | 20 | 28 |
| 12 | 19 | 23 | 29 |
| 16 | 21 | 25 | 30 |
| 18 | 22 | 27 | 31 |

4x8 Inter Block Scan Pattern for Progressive Content

| 0 | 3 | 7 | 11 |
|---|---|---|----|
| 1 | 4 | 8 | 12 |
| 2 | 6 | 9 | 14 |
| 5 | 10 | 13 | 15 |

4x4 Inter Block Scan Pattern for Progressive Content

8x8 Inter Block Scan Pattern for Interlaced Content

8x4 Inter Block Scan Pattern for Interlaced Content

4x8 Inter Block Scan Pattern for Interlaced Content

4x4 Inter Block Scan Pattern for Interlaced Content

MULTI-LAYER RUN LEVEL ENCODING AND DECODING

CROSS REFERENCE TO RELATED APPLICATION

This application claims the benefit of U.S. Provisional Patent Application Ser. No. 60/501,081, entitled "VIDEO ENCODING AND DECODING TOOLS AND TECHNIQUES," filed Sep. 7, 2003, the disclosure of which is incorporated herein by reference.

TECHNICAL FIELD

Entropy coding and decoding techniques are described. For example, a video codec uses two-layer run level coding and decoding to reduce bitrate for frequency transform coefficients.

BACKGROUND

With the introduction of digital video disks and video delivery over the Internet, digital video has become commonplace. Engineers use a variety of techniques to process digital video efficiently while still maintaining the quality of the digital video. To understand these techniques, it helps to understand how video information is represented and processed in a computer.

I. Representation of Video Information in a Computer

A computer processes video information as a series of numbers representing that information. A single number typically represents an intensity value for one picture element ["pixel"] of a picture. Several factors affect the quality of the video information, including sample depth, resolution, and frame rate.

Sample depth (or precision) indicates the range of numbers used to represent a sample. When more values are possible for the sample, quality is higher because the number can capture more subtle variations in intensity. Video with higher resolution tends to look crisper than other video, and video with higher frame rate tends to look smoother than other video. For all of these factors, the tradeoff for high quality is the cost of storing and transmitting the information, as Table 1 shows.

TABLE 1

Bitrates for different quality levels of raw video

| Description | Bits Per Pixel | Resolution | Frame Rate | Bitrate |
|---|---|---|---|---|
| Low-resolution, gray scale video monitoring | 8 (value 0-255) | 160 × 120 pixels | 7.5 | 1.2 Mbit/s |
| Internet streaming | 24 (value 0-16,777,215) | 240 × 176 pixels | 15 | 15.2 Mbit/s |
| Videoconferencing | 24 (value 0-16,777,215) | 352 × 288 pixels | 30 | 73 Mbit/s |

Table 1: Bitrates for Different Quality Levels of Raw Video

Very high quality formats such as those used for HDTV use even more bitrate. Despite the high bitrate, companies and consumers increasingly depend on computers to create, distribute, and play back high quality content. For this reason, engineers use compression (also called coding or encoding) to reduce the bitrate of digital video. Compression decreases the cost of storing and transmitting the information by converting the information into a lower bitrate form. Decompression (also called decoding) reconstructs a version of the original information from the compressed form. Two categories of compression are lossless compression and lossy compression.

Lossless compression reduces the bitrate of information by removing redundancy from the information. For example, a series of ten red pixels is represented as a code for "red" and the number ten in compression, and the series is perfectly reconstructed in decompression. Lossless compression techniques reduce bitrate at no cost to quality, but can only reduce bitrate up to a certain point. Decreases in bitrate are limited by the complexity of the video. Entropy coding is another term for lossless compression.

In contrast, with lossy compression, the quality of the video suffers but decreases in bitrate are more dramatic. For example, a series of ten pixels, each a slightly different shade of red, is approximated as ten pixels with the same "red" color. Lossy compression techniques can reduce bitrate more by removing more quality, but the lost quality cannot be restored. Lossy compression is typically used in conjunction with lossless compression—the lossy compression reduces the complexity and quality of the video, which enables greater bitrate reduction in subsequent lossless compression. For example, the series of ten pixels, each a slightly different shade of red, is represented as a code for "red" and the number 10 in compression. In decompression, the original series is reconstructed as ten pixels with the same "red" color.

II. Entropy Encoding and Decoding

Entropy encoding and decoding have been an active area of research for over 50 years. A variety of entropy encoding and decoding techniques have been developed, including run length coding/decoding, Huffman coding/decoding, and arithmetic coding/decoding. This section surveys various entropy encoding and decoding techniques.

A. Run Length and Run Level Encoding/Decoding

Run length encoding is a simple compression technique used for camera video, images, and other types of content. In general, run length encoding replaces a series (i.e., run) of consecutive symbols having the same value with the value and the length of the series. For example, the sequence 3 3 0 0 0 1 0 0 0 0 is represented as value 3, length 2, value 0, length 3, value 1, length 1, and value 0, length 4. Run length encoding is particularly effective for sequences having bursts of the same values. In run length decoding, the sequence is reconstructed from the run values and run lengths. Numerous variations of run length encoding/decoding have been developed. For additional information about run length encoding/decoding and some of its variations, see, e.g., Bell et al., *Text Compression*, Prentice Hall PTR, pages 105-107, 1990; Gibson et al., *Digital Compression for Multimedia*, Morgan Kaufmann, pages 17-62, 1998; U.S. Pat. No. 6,304,928 to Mairs et al.; U.S. Pat. No. 5,883,633 to Gill et al; and U.S. Pat. No. 6,233,017 to Chaddha.

Run level encoding is similar to run length encoding in that runs of consecutive symbols of one value (typically, the predominant value) are replaced with lengths. Unlike run length coding, however, other values are not represented with lengths. Instead, each run level pair represents a run of predominant values and a single non-predominant value. For example, the sequence 3 3 0 0 0 1 0 0 0 0 0 0 0 0 1 is represented as length 0, level 3, length 0, level 3, length 3, level 1, length 9, level 1. Run level encoding is particularly effective for sequences in which a single value predominates, with interspersed less common values.

B. Huffman Coding and Decoding
Huffman coding is another well-known compression technique used for camera video, images, and other types of content. In general, a Huffman code table associates variable-length Huffman codes with unique symbol values (or unique combinations of symbol values). Shorter codes are assigned to more probable values, and longer codes are assigned to less probable values. For example, suppose the data is a series of 8-bit samples, where 50% of the samples have a value of zero, 25% of the samples have a value of one, and the remaining samples have values in the range of 2 to 255. Rather than represent each sample with 8 bits, the encoder uses a 1-bit code "0" for the value 0, a 2-bit code "10" for the value 1, and longer codes starting with "11" for other values. The least likely values may take more than 8 bits to represent, but the average bitrate is reduced due to the efficient coding of the most common values.

To encode a symbol, the Huffman encoder replaces the symbol value with the variable-length Huffman code associated with the symbol value in the Huffman code table. To decode, the Huffman decoder replaces the Huffman code with the symbol value associated with the Huffman code.

In scalar Huffman coding, a Huffman code table associates a single Huffman code with one value. Scalar Huffman coding is relatively simple to implement, but is inefficient when a single value predominates. For example, if 70% of samples have values of 0, the ideal Huffman code would be less than 1 bit long, but the shortest possible scalar Huffman code is 1 bit long.

In vector Huffman coding, a Huffman code table associates a single Huffman code with a combination or set of values. Vector Huffman coding can lead to better bitrate reduction than scalar Huffman encoding (e.g., by allowing the encoder to exploit symbol probabilities fractionally in binary Huffman codes). On the other hand, the codebook for vector Huffman encoding can be extremely large when single codes represent large groups of symbols or symbols have a large ranges of potential values (due to the large number of potential combinations). For example, if the alphabet size is 256 (for values 0 to 255 per symbol) and the number of symbols per set to be encoded is 4, the number of potential combinations is $256^4 = 4,294,967,296$. This consumes memory and processing resources in computing the codebook codes and performing look up operations in coding and decoding.

In static Huffman coding, probabilities are set based upon probabilities expected for a certain kind of content. Alternatively, in adaptive Huffman coding, probabilities are computed for information just encoded or information to be encoded, in which case the Huffman codes adapt to changing probabilities for symbol values. Compared to static Huffman coding, adaptive Huffman coding usually reduces bitrate by incorporating more accurate probabilities, but the encoder and decoder must perform extra processing to track probabilities and maintain consistent code table states.

The results of run length encoding and run level encoding (e.g., levels and runs) can be Huffman encoded to further reduce bitrate. For example, the most common level is represented with a short Huffman code, and less common levels are represented with longer Huffman codes. Run lengths are represented with different Huffman codes. One problem with separate encoding of levels and lengths is that the most common level (e.g., 1 for run level encoding) and length (e.g., 0 for run level encoding) typically have probability>50%, which makes scalar Huffman coding inefficient. To address this concern, a single Huffman code may jointly represent the pair of a particular level value and a particular length value. With this system, the most likely level/length pair typically has a probability<50%. On the other hand, the Huffman code table needed to represent the various possible level/length pairs is very large.

Numerous variations of Huffman coding/decoding have been developed. For additional information about Huffman coding/decoding and some of its variations, see, e.g., Bell et al., *Text Compression*, Prentice Hall PTR, pages 105-107, 1990; Gibson et al., *Digital Compression for Multimedia*, Morgan Kaufmann, pages 17-62, 1998. U.S. Pat. No. 6,223,162 to Chen et al. describes multi-level run length coding of audio, U.S. Pat. No. 6,377,930 to Chen et al. describes variable-to-variable length encoding of audio, and U.S. Pat. No. 6,300,888 to Chen et al. describes entropy code mode switching for frequency domain audio coding.

C. Arithmetic Coding and Decoding

Arithmetic coding is another compression technique used for camera video, images, and other types of content. Like vector Huffman coding, arithmetic coding is often used in applications where the optimal number of bits to encode a given input symbol is a fractional number of bits, or in cases where a correlation between input symbols exists.

Arithmetic coding generally involves representing an input sequence as a single number within a given range. Typically, the number is a fractional number between 0 and 1. Symbols in the input sequence are associated with ranges occupying portions of the space between 0 and 1. The ranges are calculated based on the probability of the particular symbols occurring in the input sequence, and the fractional number used to represent the input sequence is constructed with reference to the ranges. Therefore, probability distributions for input symbols are important in arithmetic coding schemes. In fact, it is the preparation and updating of these probability distributions that makes arithmetic encoding and decoding undesirable in many contexts. The encoder and decoder must maintain consistent probability distribution states for correct performance, which can be burdensome depending on the number of different symbols and distributions tracked and the complexity of the tracking.

In context-based arithmetic coding, different probability distributions for the input symbols are further associated with different contexts. A context is a state that is reproducible by the encoder and decoder, typically based on previously decoded information, which provides guidance as to the probability distribution of an element in subsequent encoding or decoding. The probability distribution used to encode the input sequence changes when the context changes. The context can be calculated based upon different factors that are expected to affect the probability of a particular input symbol appearing in an input sequence. While context-based arithmetic coding can further improve the efficiency of arithmetic coding, the cost is additional computational overhead for maintaining and updating more states. For additional information about arithmetic coding/decoding and some of its variations, see Nelson, *The Data Compression Book*, "Huffman One Better: Arithmetic Coding," Chapter 5, pp. 123-65 (1992).

III. Implementations of Entropy Encoding and Decoding for Video

Numerous international standards specify different aspects of video encoders, decoders, and/or formats for compressed information. These standards include the H.261, MPEG-1, H.262, H.263, MPEG-4, and H.264/AVC standards. While the details of these standards vary, each uses a combination of lossy and lossless compression as well as a block-based frequency transform. With the transform, a block of pixels or other spatial domain information is converted to a block of frequency transform coefficients, which are a more efficient representation of the information. The frequency transform coefficients are then lossy encoded, zigzag scanned into a one-dimensional sequence, and losslessly encoded. The lossless compression of frequency transform coefficients typically uses some combination of run level encoding, Huffman coding, and/or arithmetic coding, but some other entropy coding techniques are specified as well. For additional details about the standards and, in particular, the myriad forms of entropy coding and decoding used in the standards, see the standards documents themselves.

The H.264 standard (sometimes called the AVC, JVT, or MPEG-4, layer 10 standard) defines two context-adaptive entropy coding methods, based on Huffman-like variable length coding and arithmetic coding, respectively. The variable length coding method is simple and not particularly resource intensive, but is also not very good in terms of compression efficiency. On the other hand, the arithmetic coding method is good in terms of compression efficiency, but is resource intensive and slow due to the state tracking that the encoder and decoder must perform.

Aside from the international standards listed above, numerous companies have produced video encoders and decoders. Microsoft Corporation has produced several versions of Windows Media Video ["WMV"]. The various versions of WMV also use different combinations of lossy and lossless compression. In WMV7, the encoder and decoder use run/level/last code tables, in which an entropy code jointly represents a run of zero-value coefficients, a non-zero level, and whether the coefficient is the last in the block. WMV7 also includes escape coding for values outside of the run/level/last tables. In WMV8 and some versions of WMV9, the encoder and decoder use variants of run/level/last coding for frequency transform coefficients, with table selection based on contextual information, and also use other entropy encoding and decoding. U.S. Patent Application Publication Nos. 2003-0138150-A1 and 2003-0156648-A1 include description of entropy encoding and decoding in WMV8.

Whatever the advantages of prior techniques and systems for lossless compression, they do not have the advantages of the present invention.

SUMMARY

In summary, various strategies for run length and run level encoding and decoding are described. For example, a video encoder uses multi-layer run level coding to quickly and efficiently compress frequency transform coefficients, and a video decoder uses corresponding multi-layer run level decoding. The various strategies can be used in combination or independently.

According to a first strategy, a tool such as a video encoder or decoder processes run level information in a multi-layer representation. For example, for first-layer runs and first-layer levels in the run level information, the tool processes the first-layer runs as second-layer runs and second-layer levels, and the tool processes the first-layer levels as second-layer runs and second-layer levels. Bitrate is thus reduced in a quick and efficient manner.

According to another strategy, a tool processes a count of significant values in a sequence when the tool processes run length or run level information for the sequence. For example, the count is the number of significant levels in the sequence. This helps the tool reduce table size and create opportunities for early termination of decoding.

According to another strategy, a tool processes Huffman codes in zones of zoned Huffman code tables when the tool processes run length or run level information. By using zoned Huffman code tables, the tool limits overall table size while providing a level of adaptivity in encoding and decoding.

According to another strategy, a tool processes Huffman codes for run length or run level information using embedded Huffman code tables. When the tool processes information for variable-size blocks, for example, the embedded Huffman code tables allow reuse of the same codes for blocks of different sizes.

These and other features and advantages of the invention will be made apparent from the following detailed description of embodiments that proceeds with reference to the accompanying drawings.

BRIEF DESCRIPTION OF THE DRAWINGS

FIG. 3 is a block diagram of a generalized video decoder in conjunction with which described embodiments may be implemented.

FIG. 5 is a flowchart showing a technique for two-layer run level encoding.

FIG. 6 is a flowchart showing a technique for two-layer run level decoding.

FIGS. 7a-7d are diagrams showing zoned Huffman code tables for run level information.

FIG. 12 is a block diagram of a YUV 4:2:0 formatted macroblock.

FIG. 13a is a block diagram showing labels for blocks within an 8×8 block, and FIGS. 13b and 13c are tables showing rules, which are collectively used to predict NUMCOEF for a current block.

FIG. 14a is a table showing thresholds for context decisions for NUMCOEF and FIG. 14b is a pseudocode listing for context selection according to a first combined implementation.

FIG. 15 is a table showing thresholds for context decisions for NUMCOEF according to a second combined implementation.

FIGS. 16a and 16b are pseudocode listings for decoding processes for the NUMCOEF syntax element according to the first combined implementation.

FIG. 17 is a pseudocode listing for a decoding process for the NUMCOEF syntax element according to the second combined implementation.

FIG. 21a is a table showing the number of zones, and FIG. 21b is a pseudocode listing showing zone widths for different contexts for encoding and decoding NUMZERO according to the second combined implementation.

FIG. 22a is a table showing thresholds for double-sided escape coding according to the first combined implementation.

FIGS. 22b and 22c are pseudocode listings for decoding processes for the NUMZERO syntax element according to the first combined implementation.

FIG. 23 is a pseudocode listing for a decoding process for the NUMZERO syntax element according to the second combined implementation.

FIG. 24 is a pseudocode listing for an overall level-layer decoding process.

FIG. 25a is a chart showing a Huffman code table for decoding RUNISL1 for certain low values of NUMCOEF according to the first combined implementation.

FIGS. 25b and 25c are pseudocode listings for decoding processes for decoding RUNISL1 according to the first combined implementation.

FIGS. 26a and 26b are pseudocode listings for decoding processes for decoding RUNISL1 according to the second combined implementation.

FIGS. 26c and 26d are charts showing Huffman code tables for decoding RUNISL1 for certain low values of NUMCOEF according to the second combined implementation.

FIG. 27a is a table showing context thresholds for NUMSL, and FIG. 27b is a pseudocode listing showing zone widths for different contexts for NUMSL.

FIGS. 27c and 27d are pseudocode listings for decoding processes for decoding NUMSL according to the first combined implementation.

FIG. 28 is a pseudocode listing for a decoding process for decoding VALSL according to the first combined implementation.

FIGS. 29a and 29b are pseudocode listings for decoding processes for decoding RUNISL according to the first combined implementation.

FIG. 30 is a pseudocode listing for an overall run layer decoding process.

FIG. 31a is a table showing context thresholds for NUMSR, and FIGS. 31b and 31c are pseudocode listings for decoding NUMSR.

FIG. 32a is a table showing context thresholds for VALSR, and FIG. 32b is a pseudocode listing for decoding VALSR according to the first combined implementation.

FIG. 33 is a pseudocode listing for decoding VALSR according to the second combined implementation.

FIG. 34a is a table showing context thresholds for RUNISR, and FIG. 34b is a pseudocode listing for decoding RUNISR according to the first combined implementation.

FIG. 35 is a pseudocode listing for decoding RUNISR according to the second combined implementation.

FIGS. 36a through 36k show zigzag scan patterns for different block sizes for progressive and interlaced content.

DETAILED DESCRIPTION

Figure 1:
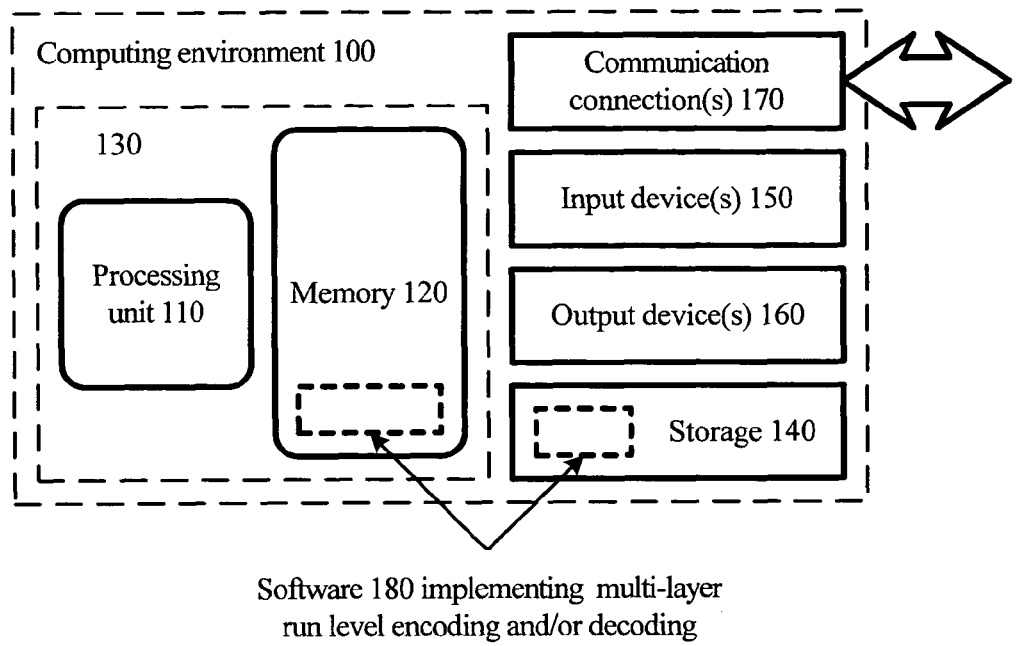
FIG. 1 is a block diagram of a suitable computing environment in which described embodiments may be implemented.

Described embodiments are directed to techniques and tools for entropy encoding and decoding. With these techniques, a video codec reduces the bitrate associated with frequency transform coefficients or other information. In some embodiments, the codec is more efficient than simple Huffman coding of run level information, since the codec addresses the problem of probabilities greater than 50% for common run and level values. At the same time, table sizes are more limited and efficient than with joint run level Huffman coding. The codec is more efficient than the variable length coding mode of the H.264 standard, and it is faster and simpler than the arithmetic coding mode of the H.264 standard.

In some embodiments, a codec uses a multi-layer representation of run level information to efficiently represent the run parts as a set of levels and runs, and efficiently represent the level parts as a different set of levels and runs. In an example two-layer run level scheme, contiguous one values in the level parts and contiguous zero values in the run parts are represented as runs with entropy codes, which allows efficient encoding without the code table sizes associated with joint run level encoding and decoding. This two-layer scheme can be generalized to a recursive scheme with more than two layers of run level coding/decoding.

In some embodiments, a codec exploits common patterns in run level information to reduce code table size and reduce encoding/decoding time. By signaling various information for a block, the run parts of the block, and/or the level parts of the block, the codec creates opportunities for early termination (without decoding explicit codes for all runs and levels) and allows for more efficient entropy encoding.

In some embodiments, a codec uses zoned Huffman code tables. These tables help limit overall table size while providing a level of adaptivity to encoding and decoding. The cost of zoning is a slight reduction in compression efficiency compared to schemes with more tables and codes.

In some embodiments, a codec works with variable-size blocks, for example, 4×4, 4×8, 8×4, and 8×8 blocks. To reduce code table size, the codec uses embedded code tables. For example, these tables allow reuse of the same tables for different block sizes, which simplifies decoder processing and saves decoder resources.

In some embodiments, a codec uses different zigzag scanning arrays for progressive and interlaced content, respectively, resulting in similar distributions for run level sequences for progressive and interlaced content. This facilitates the application of the same multi-layer run level encoding and decoding techniques and code tables for both progressive and interlaced content.

In some embodiments, a codec uses context adaptive encoding/decoding for various types of information. For example, the encoder and decoder select an appropriate Huffman code table to use based on information for the current block and/or information for neighboring blocks. Alternatively, the encoder and decoder use non-adaptive encoding/decoding for those types of information.

In various embodiments, a codec entropy encodes/decodes frequency transform coefficients for blocks of video. Uses of the codec include, but are not limited to, video over IP and other packet networks for video telephony, one-way communication, broadcast, and other applications. The codec may be integrated into a variety of devices, including personal computers, game console systems, mobile communication devices, and various media devices. While the processing techniques are described in places herein as part of a single, integrated system, the techniques can be applied separately, potentially in combination with other techniques. In alternative embodiments, a processing tool other than a video encoder or video decoder implements one or more of the techniques on video or some other type of information. For example, the techniques may be applied to blocks of frequency transform coefficients in an image codec.

Although operations for the various techniques are described in a particular, sequential order for the sake of presentation, it should be understood that this manner of description encompasses minor rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

I. Computing Environment

FIG. 1 illustrates a generalized example of a suitable computing environment (100) in which described embodiments may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing multi-layer run level encoding or decoding and/or another technique described herein.

A computing environment may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM or CD-RW that reads audio or video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 2:
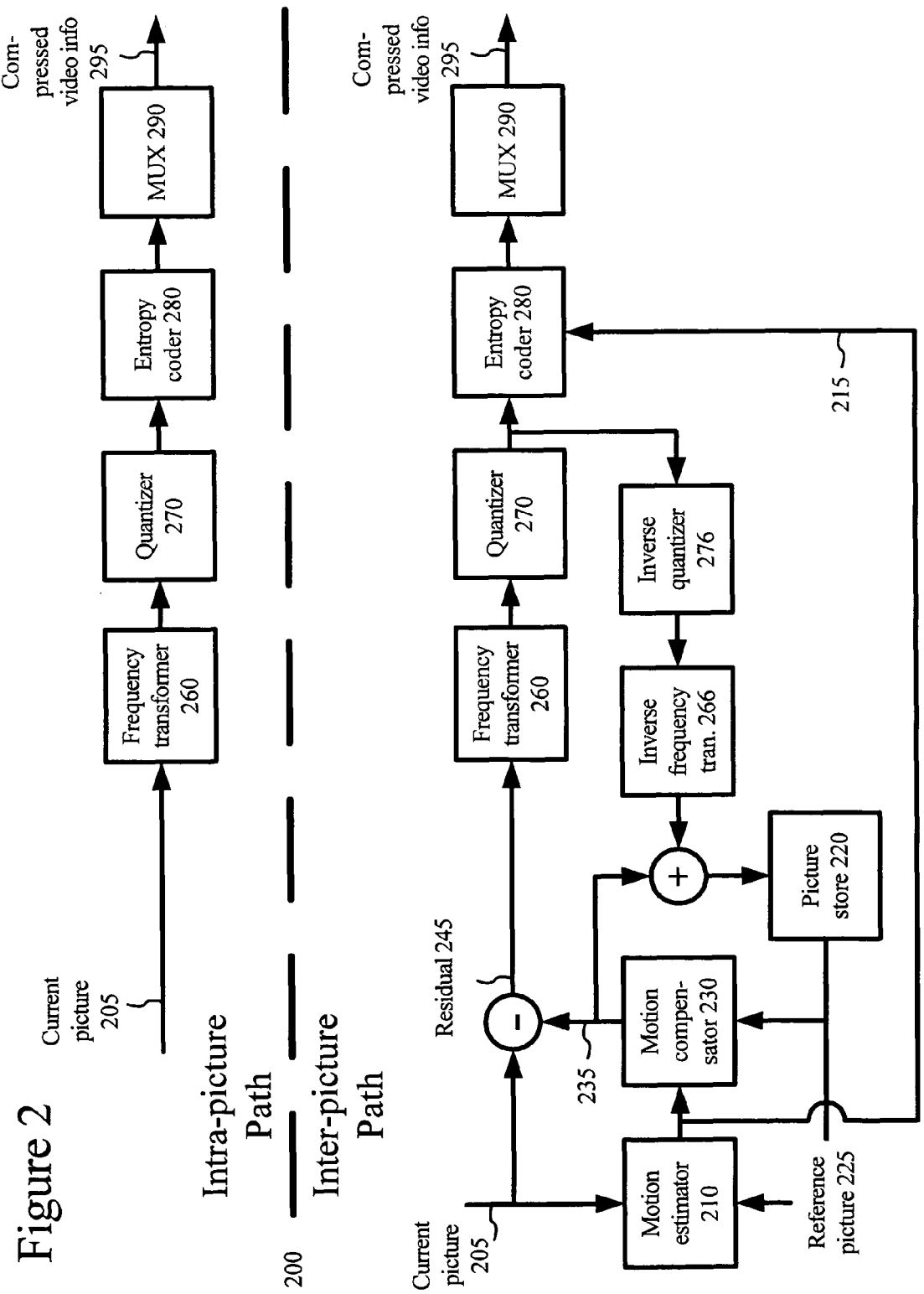
FIG. 2 is a block diagram of a generalized video encoder in conjunction with which described embodiments may be implemented.

FIG. 2 is a block diagram of a generalized video encoder (200) in conjunction with which described embodiments may be implemented. FIG. 3 is a block diagram of a generalized video decoder (300) in conjunction with which described embodiments may be implemented The relationships shown between modules within the encoder (200) and decoder (300) indicate general flows of information in the encoder and decoder; other relationships are not shown for the sake of simplicity. In particular, FIGS. 2 and 3 usually do not show side information indicating the encoder settings, modes, tables, etc. used for a video sequence, picture, macroblock, block, etc. Such side information is sent in the output bitstream, typically after entropy encoding of the side information. The format of the output bitstream can be a VC-9, WMV 9 format or other format.

The encoder (200) and decoder (300) process video pictures, which may be video frames, video fields or combinations of frames and fields. The bitstream syntax and semantics at the picture and macroblock ["MB"] levels may depend on whether frames or fields are used. There may be changes to MB organization and overall timing as well. The encoder (200) and decoder (300) are block-based and use a 4:2:0 MB format for frames, with each MB including 4 luminance 8×8 luminance blocks (at times treated as one 16×16 MB) and two 8×8 chrominance blocks. For fields, a different MB organization and format may be used. The 8×8 blocks may be further sub-divided into smaller blocks at different stages, e.g., at the frequency transform and entropy encoding stages. Alternatively, the encoder (200) and decoder (300) are object-based, use a different MB or block format, or perform operations on sets of pixels of different size or configuration.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Encoder

FIG. 2 is a block diagram of a generalized video encoder (200). The encoder (200) receives a sequence of video pictures including a current picture (205), and produces compressed video information (295) as output. Particular embodiments of video encoders typically use a variation or supplemented version of the generalized encoder (200).

The encoder (200) compresses predicted pictures and key pictures. For the sake of presentation, FIG. 2 shows a path for key pictures through the encoder (200) and a path for forward-predicted pictures. Many of the components of the encoder (200) are used for compressing both key pictures and predicted pictures. The exact operations performed by those components can vary depending on the type of information being compressed.

A predicted picture (also called p-picture, b-picture for bi-directional prediction, or inter-coded picture) is represented in terms of prediction (or difference) from one or more other pictures. A prediction residual is the difference between what was predicted and the original picture. In contrast, a key picture (also called i-picture, intra-coded picture) is compressed without reference to other pictures.

If the current picture (205) is a forward-predicted picture, a motion estimator (210) estimates motion of MBs or other sets of pixels of the current picture (205) with respect to a reference picture, which is a reconstructed previous picture (225) buffered in the picture store (220). In alternative embodiments, the reference picture is a later picture or the current picture is bi-directionally predicted. The motion estimator (210) outputs as side information motion information (215) such as motion vectors. A motion compensator (230) applies the motion information (215) to the reconstructed previous picture (225) to form a motion-compensated current picture (235). The prediction is rarely perfect, however, and the difference between the motion-compensated current picture (235) and the original current picture (205) is the prediction residual (245). Alternatively, a motion estimator and motion compensator apply another type of motion estimation/compensation.

A frequency transformer (260) converts the spatial domain video information into frequency domain (i.e., spectral) information. For block-based video pictures, the frequency transformer (260) applies a discrete cosine transform ["DCT"], variant of DCT, or other block transform to blocks of the pixel information or prediction residual information, producing blocks of frequency transform coefficients. Alternatively, the frequency transformer (260) applies another conventional frequency transform such as a Fourier transform or uses wavelet or subband analysis. The frequency transformer (260) may apply an 8×8, 8×4, 4×8, 4×4 or other size frequency transform.

A quantizer (270) then quantizes the blocks of spectral coefficients. The quantizer applies uniform, scalar quantization to the spectral information with a step-size that varies on a picture-by-picture basis or other basis. Alternatively, the quantizer applies another type of quantization to the spectral coefficients, for example, a non-uniform, vector, or non-adaptive quantization, or directly quantizes spatial domain information in an encoder system that does not use frequency transformations.

If a given MB in a predicted picture has no information of certain types (e.g., no motion information for the MB and no residual information), the encoder (200) may encode the MB as a skipped MB. If so, the encoder signals the skipped MB in the output bitstream of compressed video information (295).

When a reconstructed current picture is needed for subsequent motion estimation/compensation, an inverse quantizer (276) performs inverse quantization on the quantized spectral coefficients. An inverse frequency transformer (266) then performs the inverse of the operations of the frequency transformer (260), producing a reconstructed prediction residual (for a predicted picture) or a reconstructed key picture. If the current picture (205) was a key picture, the reconstructed key picture is taken as the reconstructed current picture (not shown). If the current picture (205) was a predicted picture, the reconstructed prediction residual is added to the motion-compensated current picture (235) to form the reconstructed current picture. The picture store (220) buffers the reconstructed current picture for use in predicting the next picture(s). In some embodiments, the encoder applies a deblocking filter to the reconstructed picture to adaptively smooth discontinuities in the blocks of the picture.

The entropy coder (280) compresses the output of the quantizer (270) as well as certain side information (e.g., motion information (215), quantization step size). Typical entropy coding techniques include arithmetic coding, differential coding, Huffman coding, run length and run level coding, LZ coding, dictionary coding, and combinations of the above. The entropy coder (280) typically uses different coding techniques for different kinds of information (e.g., DC coefficients, AC coefficients, different kinds of side information), and can choose from among multiple code tables within a particular coding technique. Various techniques for entropy encoding of frequency transform coefficients are described in detail below.

The entropy coder (280) provides compressed video information (295) to the multiplexer ["MUX"] (290). The MUX (290) may include a buffer, and a buffer level indicator may be fed back to bit rate adaptive modules for rate control. Before or after the MUX (290), the compressed video information (295) can be channel coded for transmission over the network. The channel coding can apply error detection and correction information to the compressed video information (295).

B. Video Decoder

FIG. 3 is a block diagram of a generalized video decoder (300). The decoder (300) receives information (395) for a compressed sequence of video pictures and produces output including a reconstructed picture (305). Particular embodiments of video decoders typically use a variation or supplemented version of the generalized decoder (300).

The decoder (300) decompresses predicted pictures and key pictures. For the sake of presentation, FIG. 3 shows a path for key pictures through the decoder (300) and a path for forward-predicted pictures. Many of the components of the decoder (300) are used for decompressing both key pictures and predicted pictures. The exact operations performed by those components can vary depending on the type of information being decompressed.

A DEMUX (390) receives the information (395) for the compressed video sequence and makes the received information available to the entropy decoder (380). The DEMUX (390) may include a jitter buffer and other buffers as well. Before or after the DEMUX (390), the compressed video information can be channel decoded and processed for error detection and correction.

The entropy decoder (380) entropy decodes entropy-coded quantized information as well as entropy-coded side information (e.g., motion information (215), quantization step size), typically applying the inverse of the entropy encoding performed in the encoder. Entropy decoding techniques include arithmetic decoding, differential decoding, Huffman decoding, run length and run level decoding, LZ decoding, dictionary decoding, and combinations of the above. The entropy decoder (380) typically uses different decoding techniques for different kinds of information (e.g., DC coefficients, AC coefficients, different kinds of side information), and can choose from among multiple code tables within a particular decoding technique. Various techniques for entropy decoding of frequency transform coefficients are described in detail below.

If the picture (305) to be reconstructed is a forward-predicted picture, a motion compensator (330) applies motion information (315) to a reference picture (325) to form a prediction (335) of the picture (305) being reconstructed. For example, the motion compensator (330) uses a MB motion vector to find a MB in the reference picture (325). A picture store (320) stores previous reconstructed pictures for use as reference pictures. Alternatively, a motion compensator applies another type of motion compensation. The prediction by the motion compensator is rarely perfect; so the decoder (300) also reconstructs prediction residuals.

An inverse quantizer (370) inverse quantizes entropy-decoded information. In general, the inverse quantizer applies uniform, scalar inverse quantization to the entropy-decoded information with a step-size that varies on a picture-by-picture basis or other basis. Alternatively, the inverse quantizer applies another type of inverse quantization to the information, for example, a non-uniform, vector, or non-adaptive quantization, or directly inverse quantizes spatial domain information in a decoder system that does not use inverse frequency transformations.

An inverse frequency transformer (360) converts the quantized, frequency domain information into spatial domain video information. For block-based video pictures, the inverse frequency transformer (360) applies an inverse DCT ["IDCT"], variant of IDCT, or other inverse block transform to blocks of the frequency transform coefficients, producing pixel information or prediction residual information for key pictures or predicted pictures, respectively. Alternatively, the inverse frequency transformer (360) applies another conventional inverse frequency transform such as an inverse Fourier transform or uses wavelet or subband synthesis. The inverse frequency transformer (360) may apply an 8×8, 8×4, 4×8, 4×4, or other size inverse frequency transform.

For a predicted picture, the decoder (300) combines the reconstructed prediction residual (345) with the motion compensated prediction (335) to form the reconstructed picture (305). When the decoder needs a reconstructed picture (305) for subsequent motion compensation, the picture store (320) buffers the reconstructed picture (305) for use in predicting the next picture(s). In some embodiments, the encoder applies a deblocking filter to the reconstructed picture to adaptively smooth discontinuities in the blocks of the picture.

III. Multi-Layer Run Level Encoding and Decoding

In some embodiments, a video codec uses multi-layer run level encoding and decoding techniques. For example, a video encoder or decoder as in FIG. 2 or 3 implements one or more of the techniques. Alternatively, another tool implements one or more of the techniques.

Traditional run level coding techniques encode run level information jointly as run level pairs. While this results in efficient probabilities (<50% for the most common combination), it also requires a large, inefficient symbol set in the Huffman code table to accommodate all of the likely combinations. The large code table consumes too much memory (for loading and storing) and processing (for code searching) resources, especially at the decoder, where resources are likely to be scarcer than at the encoder. With multi-layer run level encoding and decoding, the run parts and the level parts of the original run level pairs are coded separately in a run level manner. This reduces the size of Huffman code tables and also increases coding efficiency, compared with tradition joint run level pair encoding and decoding.

Figure 4:
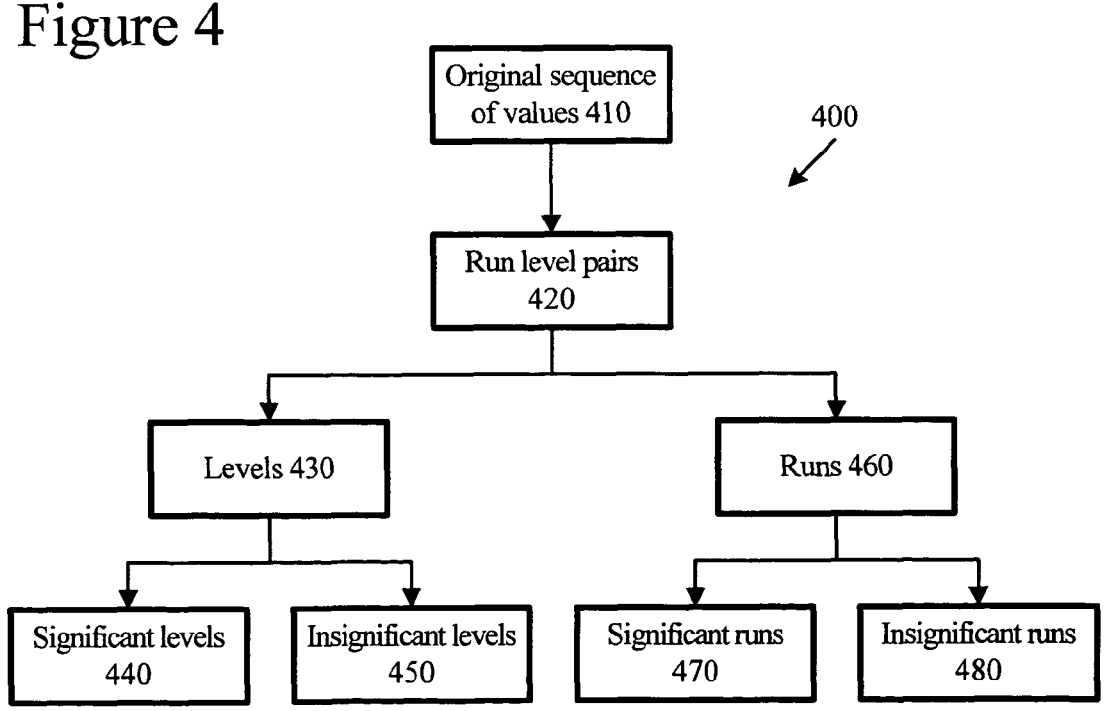
FIG. 4 is a block diagram of a framework for converting a sequence of values into a two-layer run level representation.

FIG. 4 shows the general framework (400) for converting a sequence of values (410) into a two-layer run level representation. The sequence (410) is converted to a run level pair representation (420). For example, for common probability distributions in which the predominant value is zero, the level values are non-zero values and the runs are counts of consecutive zero values between levels. The run parts and level parts are classified into two groups, a sequence of levels (430) and a sequence of runs (460).

The level values (430) are classified as significant levels ["SLs"] (440) and insignificant levels ["ISLs"] (450). For example, for common probability distributions in which the predominant non-zero values are 1 and −1, ISLs (450) are levels whose absolute value is one, and SLs (440) are levels whose absolute value is greater than 1. Applying a run level approach to the level values (430), the absolute values of SLs (440) are then coded as levels, while the numbers of consecutive ISLs (450) between neighboring SLs (440) are coded as runs.

Similarly, the run values (460) are divided into significant runs ["SRs"] (470) and insignificant runs ["ISRs"] (480). For example, for common probability distributions in which zero-length runs are the most common length, ISRs (480) are zero-length runs and SRs (470) are runs greater than zero in length. The values of SRs (470) are then coded as levels, while the numbers of consecutive ISRs (480) between neighboring SRs (470) are coded as runs.

The video encoder and decoder perform these techniques on frequency transform coefficient information. For example, the transform coefficient information is for blocks of motion compensation residuals, following frequency transform, quantization, and zigzag scanning. Or, the transform coefficient information is for intra-coded blocks following frequency transform, quantization, and zigzag scanning. Alternatively, an encoder and decoder perform these techniques on another kind of information.

The video encoder and decoder entropy encode and decode the multi-layer run level information using Huffman codes. Alternatively, the video encoder and decoder encode and decode the multi-layer run level information using arithmetic coding/decoding or some other entropy encoding/decoding.

A. Theory and Examples of Multi-Layer Run Level Encoding/Decoding

The key challenge to efficient coding of run and level information is that the run sequence and level sequence are dominated by particular values. The level sequence is usually dominated by values with an absolute value of one, and the run sequence is usually dominated by zero values. Naive Huffman coding is inefficient in handling these kinds of probability distributions. Multi-layer run level encoding and decoding address this challenge from a new perspective. With this perspective, for a sequence of run level pair information, an additional layer of run level coding/decoding is applied to a run parts of the sequence, and an additional layer of run level coding/decoding is applied to the level parts of the sequence. Further layers of run level coding/decoding may be recursively applied.

A given run level sequence includes a series of run level pairs. For example, consider the following original sequence of symbols.

original sequence: 6 1 1 0 1 0 0 0 1 2 1 1 0 0 0 0    (1).

This sequence is represented as the following sequence of run level pairs.

$$\text{run level pairs: } 0\ 6\ 0\ 1\ 0\ 1\ 1\ 1\ 3\ 1\ 0\ 2\ 0\ 1\ 0\ 1\ 4\ x \quad (2),$$

where the "x" indicates no level value for the last run level pair. (In some implementations, the last run (4) and "x" are signaled in some other way, as described below.) Each run value is classified as an ISR or SR, depending on whether the run value is zero or not. Similarly, each level value is classified as an ISL or SL, depending on whether the level value (in absolute terms) is equal to one or greater than 1, respectively. Continuing the example, the run level pairs are decomposed into a run sequence and a level sequence as follows.

$$\text{runs: } 0\ 0\ 0\ 1\ 3\ 0\ 0\ 0\ 4 \quad (3),$$

$$\text{levels: } 6\ 1\ 1\ 1\ 1\ 2\ 1\ 1\ x \quad (4).$$

As for the run parts of the original run level pairs, the values of the SRs and the number (i.e., count) of ISRs before each SR are coded. The sequence of runs shown above as sequence (3) is represented as run level pairs for the run parts.

$$\text{run level pairs of runs: } 3\ 1\ 0\ 3\ 3\ 4 \quad (5).$$

The run level pairs for the runs are then further entropy encoded, for example, using separate Huffman codes for the SRs and ISRs. Alternatively, the run level pairs for the runs are jointly encoded, encoded as run level last triplets, or otherwise entropy encoded. Moreover, run level pairs for runs may follow of SR+"ISR after" convention, rather than an "ISR before"+SR pairing convention.

As for the level parts of the original run level pairs, the values of the SLs and the number (i.e., count, run) of ISLs before each SL are coded. The sequence of levels shown above as sequence (4) is represented as run level pairs for the level parts.

$$\text{run level pairs of levels: } 0\ 6\ 4\ 2\ 2\ x \quad (6).$$

The run level pairs for the levels are then further entropy encoded, for example, using separate Huffman codes for the SLs and ISLs. Alternatively, the run level pairs for the levels are jointly encoded, encoded as run level last triplets, or otherwise entropy encoded. Moreover, run level pairs for levels may follow of SL+"ISL after" convention, rather than an "ISL before"+SL pairing convention.

While the foregoing example shows two-layer run level encoding and decoding, the techniques can be generalized to a recursive system with more than two layers of run level coding and decoding. For example, a run level sequence for level information can itself be decomposed into a run parts and a level parts, with the resulting run parts then represented as run level information, and the resulting level parts represented as run level information. For higher layer, the criteria for SLs and ISLs may change. While ISLs are used for levels with absolute value 1 at the "second" layer, for example, ISLs are used for levels with absolute value 2 at the "third" layer, and so on. Consider the following sequence of levels:

$$\text{levels: } 5\ 2\ 1\ 2\ 1\ 1\ 3\ 1\ 1\ 1\ 1\ x \quad (7),$$

$$\text{run level pairs of levels: } 0\ 5\ 0\ 2\ 1\ 2\ 2\ 3\ 4\ x \quad (8).$$

Applying run level coding to the second-layer run level representation, the SLs for the sequence are:

$$\text{levels of run level pairs of levels: } 5\ 2\ 2\ 3\ x \quad (9).$$

For a third-layer run level representation, SLs are coefficients with absolute values greater than or equal to 3, and ISLs are coefficients with absolute values of 2. So, the run level pair representation of the preceding sequence is:

$$0\ 5\ 2\ 3\ 0\ x \quad (10).$$

Similarly, for third layer and higher run level representations of run information, the count for classifying as SR vs. ISR increases from layer to layer.

B. Two-Layer Run Level Encoding and Decoding Techniques

FIG. 5 shows a technique (500) for two-layer run level encoding. An encoder such as the encoder (200) shown in FIG. 2 performs the technique (500). Alternatively, another tool performs the technique (500).

The encoder gets (510) a sequence of values. For example, the values are frequency transform coefficients for a variable-size block of a video picture. Alternatively, the values are for other information.

The encoder converts (520) the sequence of values into a runs sequence and a levels sequence. The encoder may convert the sequence directly to the runs sequence and the levels sequence, or there may be one or more intermediate versions of the sequence.

The encoder optionally encodes (530) header information for the sequence. For some encoding schemes, the header information allows the codec to more efficiently represent run and level information for the levels sequence and runs sequence. For example, the header information includes a count of non-zero value coefficients in the sequence and a count of zero-value coefficients up to the last non-zero value coefficient in the sequence, as described below. Alternatively, the encoder follows a different protocol and encodes (530) other and/or additional header information. Or, the encoder skips encoding (530) header information when such information is not necessary (e.g., for schemes such as joint run level encoding of the run level pair information for the runs sequence and levels sequence, respectively).

The encoder encodes (540) runs and levels in the level parts. For example, the encoder separately encodes runs of ISLs and levels for SLs. Alternatively, the encoder jointly codes a run ISL/SL pair, jointly codes a run ISL/SL/"last" indicator triplet according to a run/level/last encoding scheme, or uses some other encoding mechanism for the runs and levels in the level parts.

The encoder also encodes (550) runs and levels in the run parts. For example, the encoder separately encodes runs of ISRs and levels for SRs. Alternatively, the encoder jointly codes a run ISR/SR pair, jointly codes a run ISR/SR/"last" indicator triplet according to a run/level/last encoding scheme, or uses some other encoding mechanism for the runs and levels in the run parts.

While the technique (500) shown in FIG. 5 performs two-layer run level encoding, the encoder may instead iterate through stages of the technique (500) for additional layers of run level encoding. For example, the encoder splits the levels in the second-layer level parts (540) into a third-layer run parts and third-layer level parts, and encodes the third-layer run parts and third-layer level parts, respectively.

FIG. 6 shows a technique (600) for two-layer run level decoding. A decoder such as the decoder (300) shown in FIG. 3 performs the technique (600). Alternatively, another tool performs the technique (600).

The decoder optionally gets and decodes (610) header information for the sequence. For example, the header information includes a count of non-zero value coefficients in the sequence and a count of zero-value coefficients up to the last non-zero value coefficient in the sequence, as described below. Alternatively, the decoder follows a different protocol and decodes (610) other and/or additional header information. Or, the decoder skips decoding (610) header information when such information is not necessary (e.g., for schemes such as joint run level pair decoding of the run level information for the runs sequence and levels sequence, respectively).

The decoder decodes (620) runs and levels in the level parts. For example, the decoder separately decodes runs of ISLs and levels for SLs. Alternatively, the decoder jointly decodes a run of ISL/SL pair, jointly decodes a run ISL/SL/ "last" indicator triplet according to a run/level/last decoding scheme, or uses some other decoding mechanism for the runs and levels in the level parts.

The decoder also decodes (630) runs and levels in the run parts. For example, the decoder separately decodes runs of ISRs and levels for SRs. Alternatively, the decoder jointly decodes a run ISR/SR pair, jointly decodes a run ISR/SR/ "last" indicator triplet according to a run/level/last decoding scheme, or uses some other decoding mechanism for the runs and levels in the run parts.

The decoder reconstructs (640) a sequence of values from the decoded information. For example, the values are frequency transform coefficients for a variable-size block of a video picture. Alternatively, the values are for other information.

While the technique (600) shown in FIG. 6 performs two-layer run length decoding, the decoder may instead iterate through stages of the technique (600) for additional layers of run level decoding. For example, the decoder decodes a third-layer runs sequence and third-layer levels sequence for the second-layer levels sequence.

IV. Efficient Signaling of Run Level or Run Length Information

In some embodiments, a codec uses various signaling mechanisms to improve coding efficiency for run length or run level information. These techniques further improve the performance of run length, run level, and multi-layer run level encoding and decoding. For example, a video encoder or decoder as in FIGS. 2 or 3 implements one or more of the techniques. Alternatively, another tool implements one or more of the techniques.

In general, these techniques improve encoding efficiency by enabling early termination under certain conditions and/or reducing the sizes of Huffman code tables. For example, count information is signaled for a block, and the decoder is able to reconstruct some values without getting run and level information explicitly for those values. Or, by tracking count information during decoding, the decoder is able to decrease the range of possible values for certain information, allowing more efficient signaling of that information. In particular, innovations in this area include:

(1) signaling number of significant values (e.g., SRs and/or SLs for multi-layer run level information) for sequences to enable early termination and reduce table size;

(2) efficient signaling of ISL-only sequences; and (3) efficient signaling of singe-SL value sequences.

These signaling mechanisms can be used in separately or in combination, and may be integrated into various other encoding and decoding systems.

A. Efficient Signaling of Count Information for Sequences

In some embodiments, the video codec signals the number (i.e., count) of significant values for a sequence. For multi-layer run level information, for example, the codec signals the number of SRs, the number of SLs, or both. Or, for ordinary run level information, the codec signals the number of non-zero values. This allows the codec to reduce the size of the code set used to represent significant values in the sequence, and also allows the decoder to terminate decoding early under many circumstances. For example, consider the following sequence for a 4×4 block of values.

original sequence: 5 2 1 1 0 0 1 1 0 0 1 0 0 0 0 1   (11), run level pairs: 0 5 0 2 0 1 0 1 2 1 0 1 2 1 4 1   (12), runs: 0 0 0 0 2 0 2 4   (13), run level pairs of runs: 4 2 1 2 0 4   (14).

At the beginning of the run information for the sequence in the bitstream, the codec signals the total number (i.e., count) of SRs (here, 3 for the SRs of 2, 2, and 4). The codec considers information such as the maximum value of SR that is currently possible so as to reduce the size of the code table used to encode and decode SRs. The maximum SR possible may be derived from the number of SRs, the total number of non-zero coefficients (here, 8) (separately signaled), and the total number of zeros up to the last non-zero coefficient (here, 8) (separately signaled). The codec operates from back to front, since larger SR values are likely at the back, allowing for quicker reduction in code table size and often providing opportunities for early termination without explicitly signaling SR values.

In this example, the maximum value possible for the first SR to be decoded is 6. (There are three SRs and their sum is 8, so an SR of 7 or 8 is not possible as it would leave no room for the other SRs.) For the first SR to be decoded (here, SR=4 in back to front decoding) the code table size is thus limited. The code table size for subsequent SRs may be further limited. For the second SR to be decoded (SR=2), the number of SRs to decode is now 2, and the sum of SR values is now 4. The maximum value possible for the second SR to be decoded is 3, which allows further reduction in table size. For the last SR to be decoded (the first SR, SR=2), the number of SRs to decode is now 1, so the decoder may set the value of the SR to be the remaining sum of SR values, now 2. The codec need not explicitly signal the last SR to be decoded.

Other opportunities for early termination are common. For example, consider the following sequence.

original sequence: 5 2 1 0 1 0 1 0 1 0 0 0 0 0 0 0   (15), run level pairs: 0 5 0 2 0 1 1 1 1 1 1 1 7 x   (16), runs: 0 0 0 1 1 1 7   (17), run level pairs of runs: 3 1 0 1 0 1 0 7   (18).

In this example, the total number of SRs for the sequence is 4 (for the SRs of 1, 1, 1, and 7), and the sum of the SRs is 10. After decoding the first SR (SR=7) starting from the back, the number of SRs remaining is 3 and the sum of the remaining SRs is 3. Thus, the only values possible for the SRs are 1 for each SR. Codes for the last three SRs to be decoded may be omitted, and the decoder may reconstruct the values for the SRs without actually decoding codes for the SRs. The number of SRs can also be used to determine how many run ISR values to decode.

Similar improvements are possible for coding and decoding of level information for a multi-layer run level representation. Consider the following sequence.

original sequence: 6 1 1 0 3 0 0 0 1 1 1 1 0 0 0 0   (19), run level pairs: 0 6 0 1 0 1 1 3 3 1 0 1 0 1 0 1 4 x   (20), levels: 6 1 1 3 1 1 1 1 x   (21), run level pairs of levels: 0 6 2 3 4 x   (22).

At the beginning of the level information for the sequence in the bitstream, the codec signals the total number of SLs (here, 2 for the SLs 6 and 3) for the sequence. The codec considers information such as the maximum value of a run of ISLs ["RUNISL"] that is currently possible so as to reduce the size of the code table used to encode and decode RUNISLs. The maximum RUNISL possible may be derived from the total number of non-zero coefficients (here, 8) (separately signaled), the number of SLs, and a running count of ISLs decoded. The codec operates from back to front, encoding or decoding one VALSL RUNISL set at a time. Since larger RUNISL values are likely at the back, this allows for quicker reduction in code table size and often provides opportunities for early termination without explicitly signaling RUNISL values. VALSL values are likely smaller toward the end of a sequence, so back-to-front operation allows for codebooks that proportionally favor small values at the back, with switching to other codebooks towards the front.

Suppose the codec first signals the final RUNISL (here, 4). This indicates there are four 1's (or −1's) at the end of the sequence. Sign information for levels is separately signaled. The codec then signals the value of the next SL to be decoded (here, 3). At this point, considering the number of SLs, the number of non-zero coefficients (here, 8), and the number of ISLs already decoded (here, 4), the decoder is able to determine that the largest possible RUNISL before the SL of 3 is 2: NUMCOEF−ISLSDECODED−NUMSL. The remaining ISLs are split in some way around the remaining SLs (here, the single SL 6). After the next RUNISL (here, 2) is decoded, the decoder decodes the final SL and can exit because there can be no more ISL values. More generally, the decoder may terminate after decoding the final SL even if there are ISL values before the SL, since the decoder may determine how many ISL values are before the first SL from the overall number of non-zero coefficients, the number of SLs, and the number of run ISLs already decoded.

Aside from use in conjunction with signaling multi-layer run level information, signaling of count information can improve coding efficiency in other contexts. Consider the following sequence.

original sequence: 6 1 1 0 1 0 0 0 1 2 1 1 0 0 0 0 (23), run level pairs: 0 6 0 1 0 1 1 1 3 1 0 2 0 1 0 1 4 x (24).

By signaling the number of significant values, the codec is able to reduce table size for codes for run lengths, and also enable early termination without using codes for certain values. For example, in the sequence of values shown above, the total number of values is 16 (e.g., for a 4×4 block) and the number of significant values (here, values other than 0) is 8. When decoding runs from back to front, the code table size for runs is limited by the maximum possible run size, which is 8 to start. After the first run is decoded (having 4 zero values), the maximum possible run size is updated. After the run of length 1 is decoded, there can be no more runs left, so decoding can terminate early.

B. Efficient Signaling of ISL-Only Sequences

For many applications, the predominant value of levels in multi-layer run level information is 1 (in terms of absolute value). Many sequences of values include only ISL values. To exploit this pattern, in some embodiments, the video codec uses one or more codes to specially signal ISL-only sequences. For example, the codec uses a single code to jointly represent the number of non-zero coefficients in the sequence and indicate that all coefficients are ISL values. For such ISL-only sequences, the codec may skip sending additional level information, thus improving coding efficiency for frequently occurring ISL-only sequences. For example, consider the following sequence for a 4×4 block.

original sequence: 1 0 0 0 0 1 0 0 0 0 0 0 0 0 0 0 (25), run level pairs: 0 1 0 1 4 1 9 x (26), levels: 1 1 1 x (27).

When the codec signals the number of non-zero coefficients for the sequence (here, 3), the codec also signals that all of the non-zero coefficients are ISLs. The codec need not signal any additional level information. The codec signals run information by some other mechanism such that proper spacing of the ISLs is enabled.

In some implementations, the codec uses joint codes for the most commonly occurring ISL-only blocks (e.g., for blocks with 4 or fewer non-zero coefficients, all ISL) to signal the number of non-zero coefficients and indicate all are ISLs. Alternatively, the codec uses special codes for any number of non-zero coefficients in ISL-only blocks. In that case, the codec may signal ISL-only blocks with a single bit following the code for the number of non-zero coefficients.

C. Efficient Signaling of Common Single-Level Sequences

In some embodiments, the codec uses special signaling for a sequence with a single SL that has a common value. For example, the codec signals the SL value when signaling the number of SLs for the sequence. In multi-layer run level information, single-SL-value blocks are common. Joint coding of the number of SLs and SL value for single-SL-sequences improves coding efficiency for frequently occurring single-SL-value sequences. For example, consider the following sequence.

original sequence: 1 2 1 0 0 0 0 1 0 0 0 0 0 0 0 0 (28), run level pairs: 0 1 0 2 0 1 4 1 8 x (29), levels: 1 2 1 1 x (30).

In this example, when the codec signals the number of SLs for the sequence (here, 1), the codec also signals the value of the single SL (here, 2). In some implementations, so as to limit code table size, the codec uses such joint codes only for the most commonly occurring single-SL values (e.g., for sequences with a single SL having the value 2). Alternatively, the codec uses such codes for more possible SL values for single-SL value sequences.

V. Zoned Huffman Code Tables

In some embodiments, a codec uses zoned Huffman code tables to efficiently encode and decode run length or run level information. In general, zoning allows the codec to adapt depending on the context in which encoding and decoding occurs, which improves compression efficiency compared to static methods. At the same time, zoning limits the number of codes available to represent an element (and hence limits table size) so as to exclude codes for values that are impossible (or very unlikely) in a particular situation. Zoning uses fewer codes and has smaller overall table size compared to more adaptive encoding/decoding processes, with only slightly reduced compression efficiency compared to such more adaptive processes.

A. Theory and Example of Zoned Huffman Code Tables

FIG. 7a shows a zoned Huffman code table (700) for a type of header information for a multi-layer run level representation for a 4×4 block. Specifically, the header information is a count of the number of zero-value coefficients ["NUMZERO"] up to the last non-zero coefficient in a sequence. For the sake of simplicity, Huffman codes are shown as x's—actual values of the Huffman codes are not shown.

The zone used to encode and decode NUMZERO depends on the number of non-zero coefficients ["NUMCOEF"] in the sequence. An encoder and decoder both have a previously decoded NUMCOEF for the sequence in order to determine the zone used for encoding and decoding NUMZERO for the sequence. As NUMCOEF increases, the range of possible values for NUMZERO decreases. For a 16-value block, if NUMCOEF=1, then the range of possible NUMZERO values is 0 to 15. NUMZERO=0 when the non-zero value is the first value in the sequence. At the other end of the NUMZERO range, NUMZERO=15 when the non-zero value is the last value in the sequence. If NUMCOEF=15, there is only one zero value. NUMZERO=0 when the zero value is the last value in the block, and NUMZERO=1 otherwise. If NUMCOEF=0 or 16, then NUMZERO need not be signaled since the block has all zero values or no zero values, respectively.

Consider other ways to encode and decode NUMZERO. A first other way would use a static table with 16 entries for the possible values of NUMZERO. While table size would be small, the codec would fail to adapt to changes in size of the range of possible values for NUMZERO. This would result in less efficient compression—codes would be reserved for values of NUMZERO not possible given NUMCOEF. A second other way would use a separate set of NUMZERO code words for each possible value of NUMCOEF. While this would adapt the range of NUMZERO exactly depending on the value of NUMCOEF for a sequence, it would also result in a large number of codes being used—in this case 136 codes—since there is a different set of codes for each possible NUMCOEF.

Compared to these ways of encoding and decoding NUMZERO, the zoned code table allows for some adaptation depending on NUMCOEF, but "groups" code sets to reduce overall table size. If NUMCOEF is 1, a first zone (710) of codes is used for NUMZERO. If NUMCOEF is 2 or 3, a second zone (720) of codes is used. Other values of NUMCOEF result in other zones (730, 740, 750) of codes being used. The overall number of codes is less than if a separate set of codes is used for each NUMCOEF value—60 codes vs. 136 codes. Small inefficiencies result from the fact that certain values of NUMZERO (shown as shaded regions 721, 731, 741, 751) in a zone are not possible given the actual value of NUMCOEF for a sequence. The number of zones can be adjusted to tradeoff the table size and adaptivity. Moreover, the sizes of the zones can be adjusted, for example, to concentrate "shorter" zones around more probable values for the zone-selection information.

FIG. 7a shows a simple zoned Huffman table for one kind of header information for a small block. Zoning may be used in combination with various other encoding and decoding schemes such as those using embedded Huffman code tables. The table (700) shown in FIG. 7a could be the top left part of a larger table for 32-element and/or 64-element blocks. FIG. 7b shows the table (700) of FIG. 7a embedded in a larger table (760) for a 32-element block.

Zoning may be used in conjunction with other context-based adaptation, for example, selection between multiple zoned Huffman tables depending on contextual information, where the different zoned Huffman tables reflect different probability distributions in the number zones, sizes of zones, and/or Huffman codes in the zones. FIG. 7c shows a zoned code table (780) in which the number and sizes of zones is different than the table (700) of FIG. 7a. The codec might, for example, switch between the tables (700, 780).

Figure 7D:
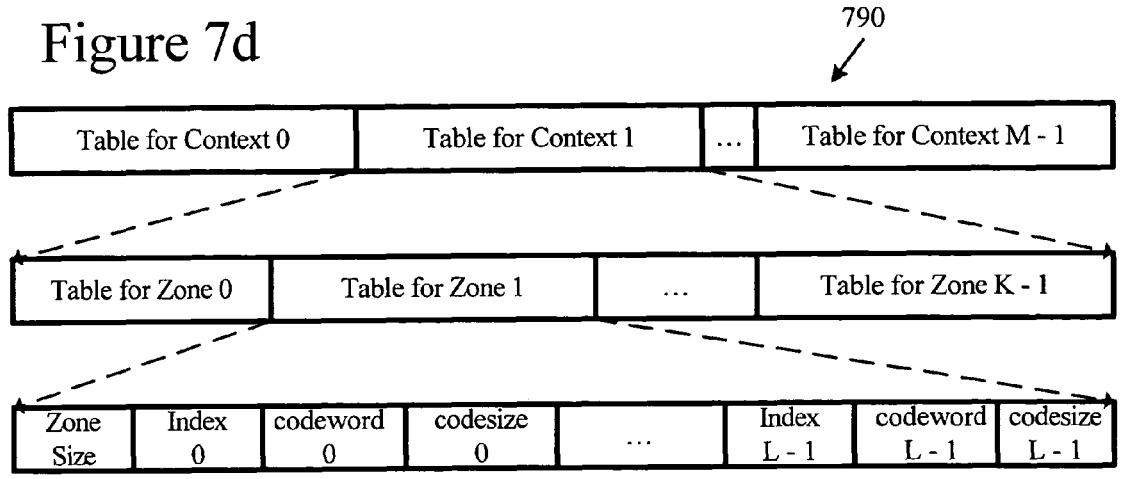

FIG. 7d illustrates Huffman tables (790) for multiple contexts and zones in one implementation. The Huffman tables (790) include Huffman tables for multiple contexts, and each context is further partitioned into zones. Each context uses a small Huffman table, and different zones cover different scenarios. The decoder decides which small table to use based on available information, making the same decision as was made in the encoder. The first element in each zone shows the number of symbols in that zone. This number is followed by the index, codeword, and code length of each of the symbols in that zone for the context.

The Huffman codes in a zoned Huffman table may represent differentials to be combined with predicted values for the elements represented in the table, or the Huffman codes may represent actual values. Aside from NUMZERO, the codec may use zoned code tables for other information, and may switch zones based upon other and/or additional information. Although FIG. 7a shows a table with a code for every possible value of NUMZERO, unlikely values may instead be represented with escape coding, which helps limit table size by eliminating codes for unlikely values.

B. Encoding and Decoding with Zoned Huffman Code Tables

Figure 8:
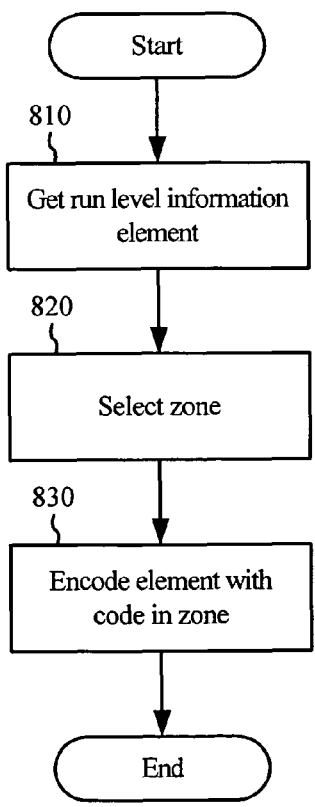
FIG. 8 is a flowchart showing a technique for encoding run level information with a zoned Huffman code table.

FIG. 8 shows a technique (800) for encoding run level information with a zoned Huffman code table. An encoder such as the encoder (200) shown in FIG. 2 performs the technique (800). Alternatively, another tool performs the technique (800).

First, the encoder gets (810) a run level information element to be encoded. For example, the element is a NUMZERO value, SL value, RUNISL value, SR value, or RUNISR value for multi-layer run level information. Alternatively, the element is a run value, level value, or run level pair for single-layer run length or run level information, or other element.

The encoder selects (820) a zone for encoding the element. The encoder selects the zone such that the decoder is able to make the same selection during decoding. For example, the encoder selects a zone for encoding NUMZERO based upon NUMCOEF for the sequence. Alternatively, the encoder considers other and/or additional information. The encoder then encodes (830) the element using a Huffman code from the selected zone.

Figure 9:
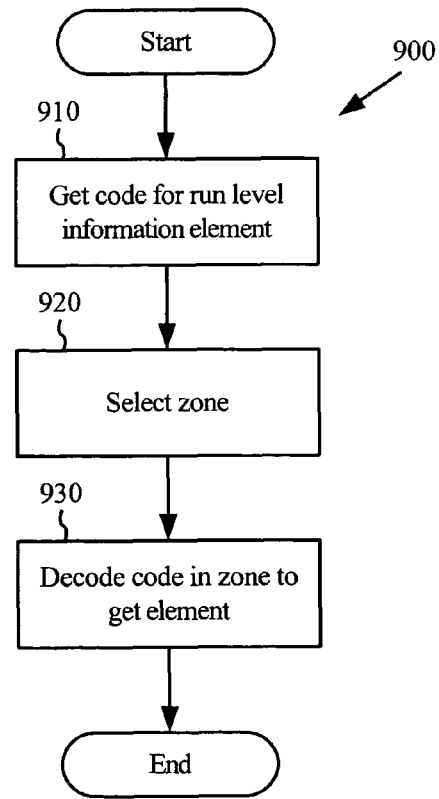
FIG. 9 is a flowchart showing a technique for decoding run level information with a zoned Huffman code table.

FIG. 9 shows a technique (900) for decoding run level information with a zoned Huffman code table. A decoder such as the decoder (300) shown in FIG. 3 performs the technique (900). Alternatively, another tool performs the technique (900).

First, the decoder gets (910) a Huffman code for a run level information element to be decoded. For example, the element is a NUMZERO value, SL value, RUNISL value, SR value, or RUNISR value for multi-layer run level information. Alternatively, the element is a run value, level value, or run level pair for single-layer run length or run level information, or other element.

The decoder then selects (920) a zone for decoding the element. For example, the decoder selects a zone for decoding NUMZERO based upon NUMCOEF for the sequence. Alternatively, the decoder considers other and/or additional information. The decoder then decodes (930) the Huffman code in the selected zone to obtain the element.

VI. Embedded Huffman Code Tables

In some embodiments, a codec uses embedded Huffman code tables, which improve the performance of run length, run level, or multi-layer run level encoding and decoding. Sequences of values for variable-size blocks (e.g., 8×8, 8×4, 4×8, 4×4) have varying numbers of values (e.g., 64, 32, 16). Using different code tables for different block sizes can cause resource problems, especially for decoders. Embedded Huffman code tables address this concern.

Embedded Huffman code tables are designed such that the same table (or subsets thereof) can be applied to different size sets of information. For blocks of frequency transform information, for example, the same table (or subsets thereof) can be applied for an 8×8, 8×4, 4×8, or 4×4 block. For many types of run length, run level, and multi-layer run level information, the values possible for a 4×4 block are subset of the values possible for an 8×4 or 4×8 block, which are a subset of the values possible for an 8×8 block. Moreover, for many types of information, the probability distributions for the subsets roughly overlap. Thus, the same Huffman codes can be used for a 4×4 block, a corresponding subset for an 8×4 or 4×8 block, and a corresponding subset for an 8×8 block. 8×4 and 4×8 blocks may be zigzag scanned with different scan patterns so that the one-dimensional output of scanned elements has roughly the same probability distribution for 4×8 and 8×4 blocks.

Figure 10A:
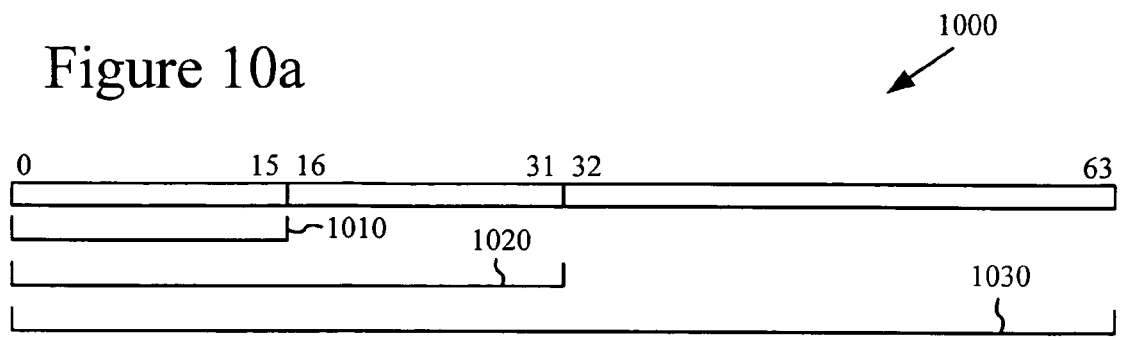
FIGS. 10a and 10b are diagrams showing embedded Huffman code tables for run level information.

FIG. 10a shows embedded Huffman code tables (1000) that extend along one dimension. A first range (1010) includes codes for the possible values for a 4×4 block. A second range (1020) includes the codes of the first range (1010) and codes for the other possible values for an 8×4 or 4×8 block. A third range (1030) includes the codes of the second range (1020) and codes for the other possible values for an 8×8 block.

Figure 10B:
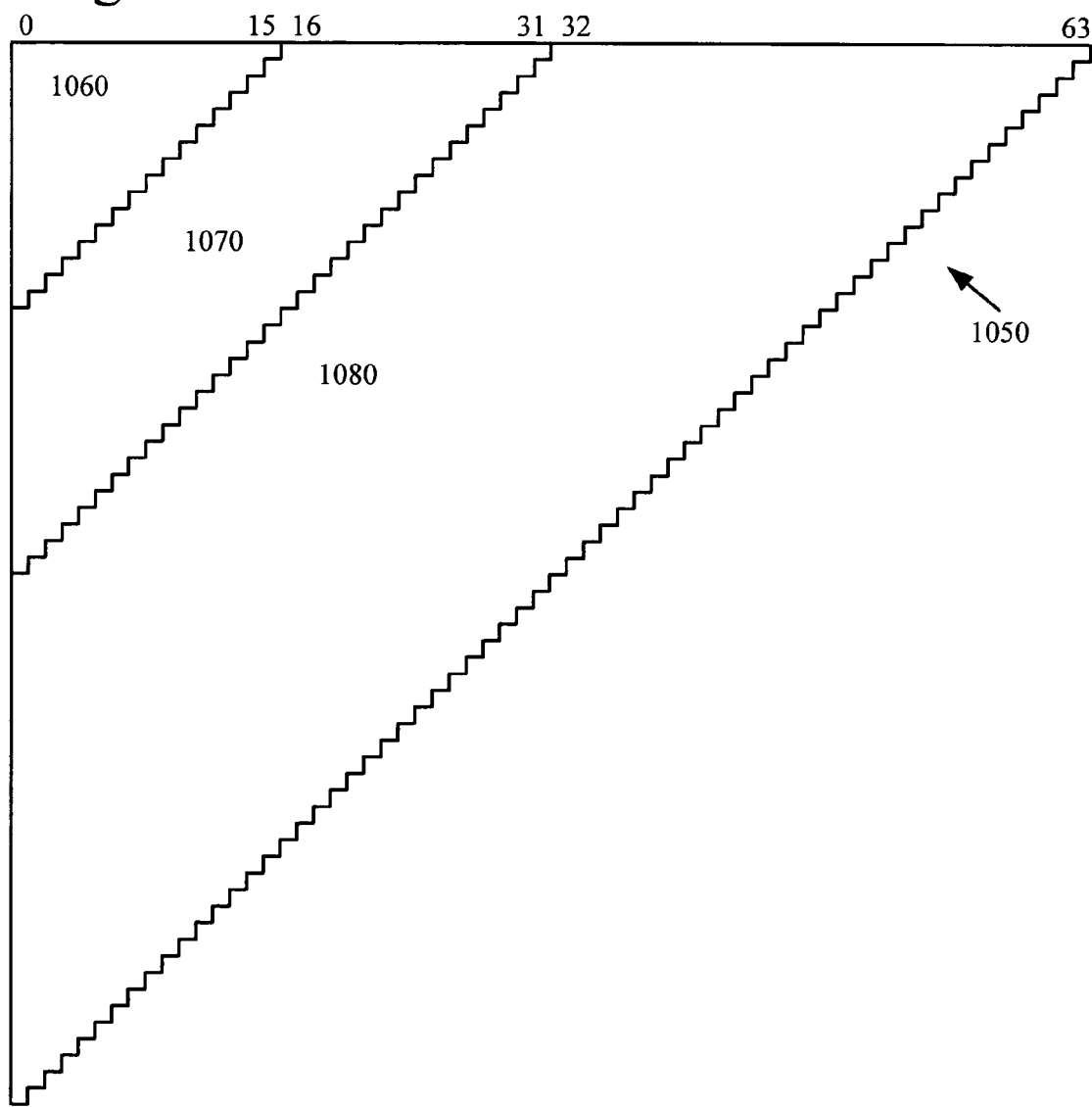

FIG. 10b shows embedded Huffman code tables (1050) for adaptive encoding and decoding. Different code sets for the element to be encoded are the different rows in the tables. The specific code set to be used in a particular situation is selected depending on, for example, a previously encoded/decoded value or values. The first range (1060), second range (1070), and third range (1080) correspond to the sets of codes for 4×4, 8×4/4×8, and 8×8 blocks, respectively.

The codec may use embedded code tables for various types of information. For example, the encoded/decoded element may be a NUMZERO value, SL value, RUNISL value, SR value, or RUNISR value for multi-layer run level information. Alternatively, the element is a run value, level value, or run level pair for single-layer run level information, or other element. Embedded Huffman code tables may be used in conjunction with other context-based adaptation, for example, selection between zoned, embedded Huffman tables. The Huffman codes in embedded Huffman tables may represent differentials to be combined with predicted values for the elements represented in the table, or the Huffman codes may represent actual values. Unlikely values may be represented with escape coding. Finally, embedded code tables may be used for block sizes other than and/or in addition to 4×4, 8×4, 4×8, and 8×8, or for sets of elements related according to some other pattern.

VII. Combined Implementations

While the foregoing techniques may be applied independently and separately, they may also be combined in a single, integrated system. For example, a video codec implements a combination as described below. Alternatively, another tool implements such a combination.

A. Bitstream Syntax and Semantics

The codec signals the use of two-layer run level coding at the sequence layer of the bitstream with a single bit flag used to select between two-layer run level coding and 3D run level last coding. Alternatively, the codec signals the use of two-layer run level coding at some other syntax layer, or uses two-layer run level coding all of the time.

Figure 11A:
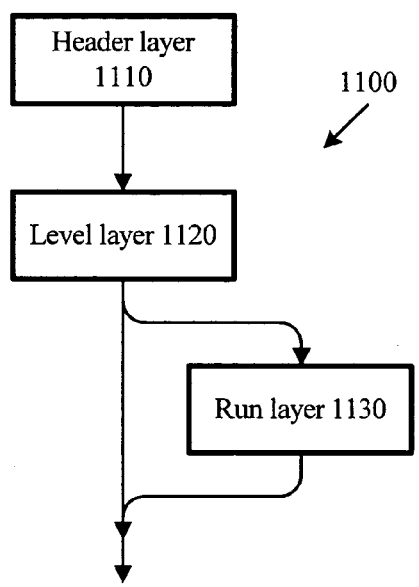
FIG. 11a-11d are syntax diagrams showing a block-layer syntax element for a two-layer run level representation.

Two-layer run level information for a given block is signaled at the block syntax layer of the bitstream. FIG. 11a shows a block-layer syntax element (1100) for Huffman coded, two-layer run level information for a block. The element (1100) may be included with other block-layer information for intra-coded blocks and/or intercoded blocks. For example, for an intra block other block-layer elements include information specifying a DC coefficient, and the two-layer run level information specifies AC coefficients. Or, for an inter block, the other block-layer elements include transform type information. If the element (1100) includes information for a block that is less than full size (e.g., for a 4×4, 4×8, or 8×4 block within an 8×8 block), the element (1100) repeats for each of multiple blocks within the full-size block (e.g., repeating four times for 4×4 blocks). Alternatively, the element (1100) is included elsewhere in the bitstream and/or has a different organization.

The element (1100) includes as sub-elements a Huffman header layer (1110), level layer (1120), and run layer (1130). The header layer (1110) contains various information for a whole sequence for a block. Information for non-zero values is signaled as necessary at the level layer (1120), and information for zeros before each non-zero value is signaled as necessary at the run layer (1130).

Figure 11D:
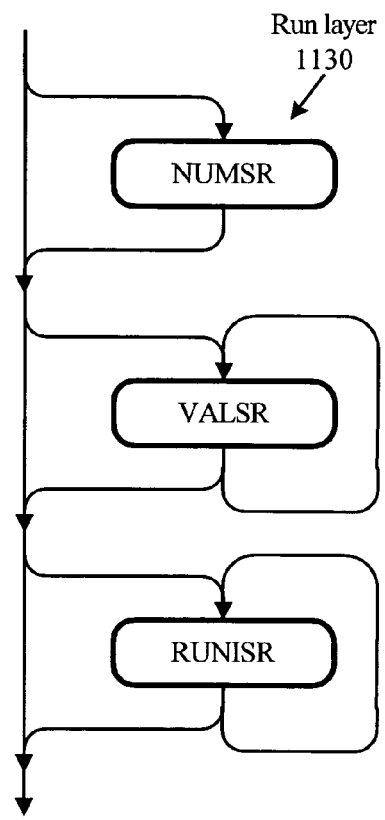
Figure 11B:
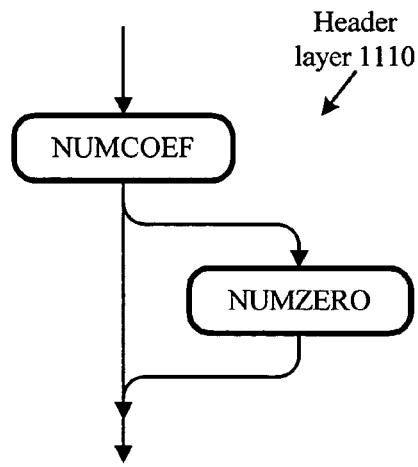

FIG. 11b shows the header layer (1110) in more detail. NUMCOEF specifies the number of non-zero coefficients in a sequence for a coded block. It also may signal four ISL-only cases, where the sequence has up to four non-zero coefficients and all of their absolute values are equal to one. In these cases, only the signs of the non-zero coefficients are signaled in the level layer. NUMZERO specifies the number of zeros up to the last non-zero coefficient in the original zigzag scanned sequence. NUMZERO is skipped when NUMCOEF shows that all coefficients in the sequence are non-zero.

Figure 11C:
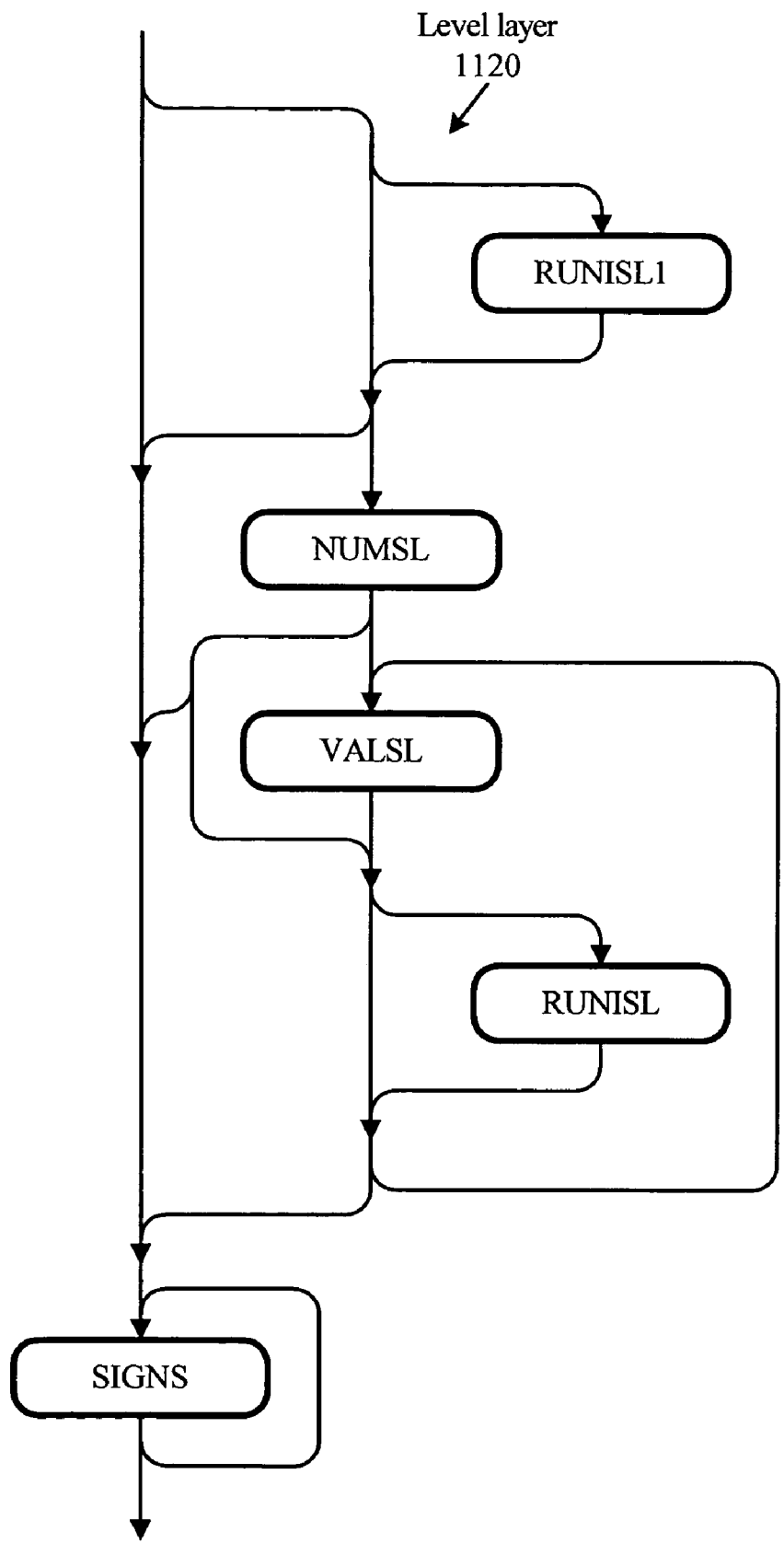

FIG. 11c shows the level layer (1120) in more detail. In general, the level information for a sequence is signaled back-to-front in a run level manner, from high frequency coefficients of the sequence to low frequency coefficients of the sequence, and the absolute value of a SL is signaled followed by the number of ISLs before this SL, but there are various exceptions to this general approach.

If NUMCOEF does not indicate an ISL-only block and NUMCOEF is not 1, the first element in the level layer (1120) is RUNISL1. RUNISL1 specifies the number of ISLs at the end of the sequence of levels for the block (i.e., after the last SL). If RUNISL1=NUMCOEF, there are no more non-zero coefficients, and the signs of all coefficients are decoded next.

When RUNISL1 is less than NUMCOEF, the next symbol at the level layer (1120) is NUMSL. NUMSL specifies the number of SLs in the sequence for the block. In general, NUMSL is followed by NUMSL groups of symbols, where each group includes a VALSL value (for the absolute value of a SL) and a RUNISL value (for the number of ISLs before this SL). Given NUMCOEF, RUNISL1, and NUMSL, the number of ISLs up to the last SL can be derived as NUMCOEF−RUNISL1−NUMSL, and this information is used to select suitable Huffman table to decode RUNISL.

A special value of NUMSL indicates when there is only one SL and its absolute value is 2. In this case, VALSL is not presented in the bitstream, and the RUNISL before this SL is signaled next. The codec tracks the number of SLs and ISLs that have been decoded. If these figures show that the remaining coefficients are all SLs, then RUNSL is skipped and only the remaining VALSLs are decoded.

The last part of level layer (1120) contains the signs of all non-zero coefficients, from the last one to the first one. Each sign is represented by one bit, 0 for positive and 1 for negative. If NUMCOEF indicates that all coefficients of the current block are ISLs, the level layer (1120) only contains sign information.

FIG. 11*d* shows the run layer (1130) in more detail. NUMSR specifies the number of SRs. NUMSR is skipped if NUMCOEF=1. VALSR specifies the value of an SR. VALSRs signaled back to front. RUNISR specifies the number of ISRs before each SR. RUNISRs are sent front to back, since most ISRs are at the beginning of a run sequence, and front to back signaling provides greater opportunities for code table size reduction and early termination.

The following sections address decoding of the respective syntax elements described above. Encoding of the syntax elements uses the same context and zone selection mechanisms, and uses the inverse mechanism for operations such as Huffman coding and writing to a bitstream.

B. Decoding Header Layer—NUMCOEF

Decoding NUMCOEF for a current block uses information (such as NUMCOEF) from two neighboring blocks to decide a context for the current block. A Huffman table is provided for each of the available contexts. At a high level, decoding NUMCOEF involves the following steps:

(1) predict NUMCOEF from information (such as the NUMCOEF values) from the top and left neighbors;

(2) decide the context and select the corresponding Huffman code table; and (3) decode NUMCOEF using the selected Huffman code table.

1. Spatial Prediction for NUMCOEF

The predicted NUMCOEF for the current block (PredNumCoef) is obtained from PT and PL, which correspond to the NUMCOEFs of the top neighbor and left neighbor, respectively. If PT or PL refers to an inter block, its value is simply the NUMCOEF of that neighbor. Otherwise, the value of PT or PL is NUMCOEF+1 for that neighbor, so as to include the DC coefficient.

When both neighbors exist, PredNumCoef=(PT+PL+1)/2. If one of the specified neighbors does not exist (e.g., its position would be outside the boundary of the picture), the number from the other neighbor is used directly as PredNumCoef. If neither neighbor exists, a default value of 1 is used for PredNumCoef. Finally, if a specified neighbor is not coded, its NUMCOEF contribution is treated as zero.

An 8×8 block may be encoded with any one of the 8×8, 8×4, 4×8, or 4×4 transform modes. The top neighbor or left neighbor of a given 8×4, 4×8, or 4×4 block may be in the same 8×8 block or a different 8×8 block. The top neighbor or left neighbor for a block may be within the current MB or in a neighboring MB. The procedure for finding NUMCOEF for a specified neighbor can be divided into two steps: (1) first find the neighbor's block index within a MB, and (2) find the variable-size block index of the specified neighbor within the block.

If the desired neighbor is not within the current block, the following rules are used to select its block index. These rules assume the use of YUV 4:2:0 formatted MBs. FIG. 12 shows a YUV 4:2:0 formatted MB (1200) with conventional block labels for blocks 1 to 6. For chrominance block 5 or 6 of the current MB (1200), the top or left neighbor block is the co-labeled block of the top or left neighbor MB, respectively. For luminance block 1 or 2 of the current MB (1200), the top neighbor block is block 3 or 4 in the top neighbor MB, respectively. For luminance block 3 or 4 of the current MB (1200), the top neighbor block is block 1 or 2 of the current MB (1200), respectively. Similarly, blocks 2 and 4 of the left neighboring MB are the left neighbor blocks of blocks 1 and 3 of the current MB (1200), respectively, and blocks 1 and 3 within the current MB (1200) are the left neighbor blocks of blocks 2 and 4 of the current MB (1200), respectively.

Once the block indices for the neighbors are known, additional rules are used to get PT and PL for the neighbors. These rules depend on the transform mode of the current block, as well as the transform modes of the neighbors. FIGS. 13*a*-13*c* show a framework for applying such rules to compute PT and PL. The labels N0, N1, N2, and N3 denote NUMCOEF (including the DC coefficient for intra blocks) of the respective blocks in an 8×8 block. Intra mode is treated as an 8×8 mode for these tables. FIG. 13*a* shows assignments (1310) of these labels to blocks for different block partitions. FIG. 13*b* shows a set (1320) of rules for computing NUMCOEF for a top neighbor—PT. FIG. 13*c* shows a set (1330) of rules for computing NUMCOEF for a left neighbor—PL. After combining PT and PL to compute PredNumCoef, a final clip operation may be applied to ensure that the PredNumCoef is no larger than the current block size.

2. Context Decision for NUMCOEF

Next, the decoder decides the context in which decoding of NUMCOEF should occur depending on PredNumCoef. Two different implementations are described. These two implementations are further elaborated in subsequent sections as well.

FIG. 14*a* shows the thresholds (1410) for inter block and intra block NUMCOEF context decisions in the first implementation. Intra blocks have 5 contexts. For inter blocks, there are 5 contexts for 4×4 blocks and 6 contexts for other types of blocks. FIG. 14*b* shows pseudocode (1420) indicating how a decoder iterates through the thresholds for the possible contexts for the current block mode until the context for the given PredNumCoef is found.

FIG. 15 shows the thresholds (1500) for NUMCOEF context decisions in the second implementation. There are four contexts for inter blocks and three for intra blocks. A decoder uses the $n^{th}$ context table if the following conditions are satisfied for a block mode: PredNumCoef>ContextThresholds_NUMCOEF[n−1], and PredNumCoef<=ContextThresholds_NUMCOEF[n].

3. Decoding NUMCOEF in Selected Context

The decoder then decodes the Huffman code for NUMCOEF using the Huffman code table for the selected context.

a. First Implementation

In the first implementation, the decoder uses three sets of VLC tables for inter mode blocks—one for 8×8 blocks, one for 8×4 and 4×8 blocks, and one for 4×4 blocks. Each table contains a number of contexts as described above. In the Huffman table for each context, the first four symbols not only specify a number up to four non-zero coefficients in the current block, but also indicate that all these coefficients are ISLs.

Let N be the size of a coded block. The value of N is 64, 32, 32, or 16 for an inter-coded 8×8 block, 8×4 block, 4×8 block, or 4×4 block, respectively. N is 63 for an 8×8 intra block, for the 63 AC coefficients of the block. For a size N, the number of non-zero coefficients possible in a block ranges from 1 to N. (Blocks with no non-zero coefficients are handled separately.) This implies that there are 64 possibilities for N=64, 32 possibilities for N=32, etc.

To reduce table size, escape coding is applied in contexts when N is 64, 63 or 32. The number of symbols in each Huffman context for decoding NUMCOEF is 37 for an 8×8 inter block, 21 for an 8×4 or 4×8 inter block, 20 for a 4×4 inter block, for an intra block. For 8×8 inter blocks, the tables for decoding NUMCOEF cover NUMCOEF=1 to NUM-COEF=32, in addition to the four ISL-only symbols. One more symbol is provided at the end of the table as an escape symbol for NUMCOEF>=33. If the escape symbol is present in the bitstream, the next 5 bits are used as a fixed length code ["FLC"] to decode NUMCOEF. For 8×4 and 4×8 inter blocks, the tables for NUMZERO cover NUMCOEF=1 to NUMCOEF=16, in addition to the four ISL-only symbols. One more symbol is provided as escape symbol for NUMCOEF>=17. If the escape symbol is present in the bitstream, the next 4 bits are used as a FLC to decode NUMCOEF.

FIG. 16a shows pseudocode (1600) illustrating the decoding process for NUMCOEF for inter blocks according to the first implementation. In the pseudocode (1600), PredNumCoef is computed by GetPredNumCoef( ). HufPtr_NUMCOEF [BlkMode] [Context] points to the selected Huffman table for a given block mode (e.g., 4×4) and selected context. V1c_decode( ) represents the Huffman decoding process with the given Huffman table. NUMCOEF is set based on the index returned from the Huffman decoding, and an ISL only flag is set.

The tables for intra mode NUMCOEF have 5 contexts, and each context covers NUMCOEF=1 to NUMCOEF=31. In addition, each contains four symbols for ISL-only blocks and one symbol for escape coding. A five-bit FLC follows the escape symbol to decode NUMCOEF values that are greater than or equal to 32. Only AC coefficients of intra blocks are encoded by the two-layer run level method, therefore the maximum value of NUMCOEF for an intra block is 63. FIG. 16b shows pseudocode (1610) illustrating the decoding process for NUMCOEF for intra blocks according to the first implementation.

b. Second Implementation

In the second implementation, for each block mode, one Huffman table is provided for each context. Let N be the size of a coded block. The value of N is 64, 32, 32, or 16 for an inter-coded 8×8 block, 8×4 block, 4×8block, or 4×4 block, respectively. N=63 for 8×8 intra block AC coefficients.

For a block of size N, the number of non-zero coefficients in a coded block ranges from 1 to N. Each context of the Huffman table for NUMCOEF contains N+4 symbols. For n=0 to N−1, the $n^{th}$ symbol means that NUMCOEF=n+1. For n=N to N+3, NUMCOEF=n−N+1. Codes in this latter range also indicate that all non-zero coefficients of the current block are ISLs. FIG. 17 shows pseudocode (1700) illustrating the decoding process for NUMCOEF according to the second implementation.

C. Decoding Header Layer—NUMZERO

If NUMCOEF is less than the size for the sequence for the current block, the total number of zeros ["NUMZERO"] up to the last non-zero coefficient is signaled next. The codec selects a Huffman table based on the current coding mode (i.e., intra or inter), the values of NUMZERO of two neighbors, the transform size of the current block, and the value of NUMCOEF for the current sequence (since the maximum value of NUMZERO is N−NUMCOEF for block size N). At a high level, decoding NUMZERO involves the following steps:

(1) predict NUMZERO from NUMZERO of the top and left neighbors;
(2) decide the context for the code table (if the current block is in inter mode);
(3) decide the zone for the code table; and
(4) decode NUMZERO with the selected zone of the selected code table.

Alternatively, the codec does not consider the transform size for the current block when selecting a Huffman code table, or otherwise chooses context and/or zone using other and/or additional information.

1. Spatial Prediction for NUMZERO

To decode NUMZERO, the decoder obtains a predicted value for NUMZERO ["PredNumZero"] based upon NUMZEROs for the top and left neighbors, denoted as PT and PL, respectively. PT and PL for NUMZERO are computed following the same rules as PT and PL for NUMCOEF, but for NUMZERO, N0 to N3 in FIGS. 13a to 13c represent NUMZERO values.

In general, the decoder obtains a final prediction for PredNumZero the same way as for NUMCOEF prediction. When both neighbors exist, PredNumZero=(PT+PL+1)/2. If one neighbor does not exist (e.g., its position would be outside the boundary of the picture), the number from the other neighbor is used directly as PredNumZero. If neither neighbor exists, a default value of 1 is used for PredNumZero. Finally, if a neighbor is not coded, its NUMZERO contribution is treated as zero.

2. Context Decision for NUMZERO

Figure 18:
FIG. 18 is a table showing thresholds for context decisions for NUMZERO in the first combined implementation.

Next, the decoder decides the context in which further decoding of NUMZERO occurs. FIG. 18 shows thresholds (1800) for inter block NUMZERO context decisions according to the first implementation. Two contexts are provided for NUMZERO for inter blocks, with different context thresholds (1800) for different transform modes. NUMZERO is decoded using context 0 if PredNumZero is less than or equal to the threshold in FIG. 18 for context 0 for the appropriate transform size, otherwise context 1 is used. One context is provided for intra blocks. As such, prediction of NUMZERO is not necessary for a context decision for intra blocks.

Figure 19:
FIG. 19 is a table showing thresholds for context decisions for NUMZERO in the second combined implementation.

FIG. 19 shows thresholds (1900) for inter block NUMZERO context decisions according to the second implementation. There are three contexts for inter blocks and one for intra blocks. Again, the different context thresholds (1900) are for different transform modes. A decoder uses context n if the following two conditions are satisfied for a given transform mode: PredNumZero>ContextThresholds_NUMZERO[n−1] and PredNumZero<=ContextThresholds_NUMZERO[n].

3. Zone Decision for NUMZERO

To improve coding efficiency, the decoder also selects the Huffman table based upon NUMCOEF, since the maximum value of NUMZERO for the sequence is N−NUMCOEF for a block of size N. There are N−1 possible scenarios for NUMCOEF, corresponding to NUMCOEF=1 up to NUMCOEF=N−1. Having a separate set of Huffman codes for NUMZERO for each possible value of NUMCOEF results in many different tables. To reduce overall size, different NUMCOEF cases are grouped into zones. When multiple NUMCOEF values are grouped into one zone, the same Huffman code table is selected for decoding NUMZERO for each of those multiple NUMCOEF values.

Figure 20A:
FIG. 20a is a table showing the number of zones.
Figure 20B:
FIG. 20b is a pseudocode listing showing zone widths for different contexts for encoding and decoding NUMZERO according to the first combined implementation.

FIGS. 20a and 20b show a framework for deciding a zone for decoding NUMZERO according to the first combined implementation. FIG. 20a shows the number of zones for different transform sizes and coding modes. FIG. 20b shows zone widths for the different contexts for different transform sizes and coding modes. For example, for an 8×8 inter block, the decoder selects between two contexts and eight different zones per context. For the first context, the first, second, third, and fourth zones correspond to NUMCOEF=1, 2, 3, and 4, respectively. As NUMCOEF increases, zone resolution decreases. The fifth zone corresponds to NUMCOEF=5 to 8, the sixth zone corresponds to NUMCOEF=9 to 12, the seventh zone corresponds to NUMCOEF=13 to 20, and the eighth zone corresponds to NUMCOEF=21 to 63. The second context for an 8×8 inter block has the same number of zones, but different zone resolutions FIGS. 21a and 21b show a framework for deciding a zone for decoding NUMZERO according to the second combined implementation. FIG. 21a shows the number of zones for different transform sizes and coding modes. FIG. 21b shows zone widths for the different contexts for different transform sizes and coding modes. For inter 4×4 mode (not shown), there are 15 zones, each zone corresponding to a different possible value of NUMCOEF for a 4×4 block.

4. Decoding NUMZERO in Selected Zone

The decoder then decodes the Huffman code for NUMZERO using the Huffman code table for the selected zone and context.

a. First Combined Implementation

For a block of size N, the range of values for the $n^{th}$ NUMZERO zone is N−ZoneLimit_NUMZERO[n]+1, where ZoneLimit_NUMZERO[n] represents the minimal value of NUMCOEF in the $n^{th}$ zone. For example, suppose the third zone of an inter 8×8 table for NUMZERO covers the cases with NUMCOEF=3 or 4. The maximum value possible for NUMZERO in this zone is 61. The block size is 64, and a simple Huffman table for this zone has 64−3+1=62 symbols, corresponding to NUMZERO=0 to 61.

To reduce the number of codes, the codec uses double-sided escape coding in each zone of inter 8×8 blocks and intra blocks. The first symbol in each table is the escape symbol. Values of NUMZERO that are within the left threshold and right threshold of each zone are covered by the Huffman table. Other values are signaled by a five-bit FLC following the escape symbol. FIG. 22a shows the left and right thresholds (2200) for decoding NUMZERO for inter 8×8 blocks and 8×8 intra blocks. The thresholds are chosen such that different zones favor different ranges of NUMZERO.

FIG. 22b shows pseudocode (2210) for decoding NUMZERO for inter blocks according to the first combined implementation. Different NUMCOEFs allow different possible values for NUMZERO, and NUMZERO tends to be larger as NUMCOEF increases. Thus, the Huffman tables for zones with more than one NUMCOEF are shared from the right side. The function GetZoneHead_NUMZERO( ) returns the first NUMCOEF in the current zone, which can be computed by the definition of zones. The zone head information is used to determine a "rightshift" value for decoding NUMZERO, and codes are adjusted by an amount that increases as NUMCOEF increases within a zone. In this way, NUMZERO is more efficiently signaled for those higher values of NUMCOEF in a zone. NUMZERO values are also adjusted by the appropriate escape coding threshold if an escape code is used. FIG. 22c shows pseudocode (2220) illustrating how to decode NUMZERO for intra blocks according to the first combined implementation.

b. Second Implementation

For a block of size N, the size of the symbol set in the $n^{th}$ NUMZERO zone is determined as N−ZoneLimit_NUMZERO[n]+1. FIG. 23 shows pseudocode (2300) for decoding NUMZERO according to the second combined implementation.

D. Decoding Level Layer—Overall

The decoder then decodes the level layer (1120) information. FIG. 24 shows pseudocode (2400) for overall level-layer decoding according to the first combined implementation.

E. Decoding Level Layer—RUNISL1

If it is concluded from the decoding of NUMCOEF that not all coefficients are ISLs (i.e., ISLONLY=FALSE) and NUMCOEF is not 1, the decoder decodes the first run of ISLs ["RUNISL1"] in the bitstream. RUNISL1 specifies the number of ISLs at the end of the level sequence (i.e., after the last SL). Two scenarios are considered. If NUMCOEF<=4, not all of the coefficients are ISLs (if they were all ISL, ISLONLY would=TRUE) and RUNISL1 is between 0 and NUMCOEF−1. If NUMCOEF>4, all coefficients could be ISLs, and RUNISL1 ranges from 0 to NUMCOEF.

1. First Implementation

According to the first combined implementation, the codec uses multiple sets of VLC tables. The first covers the cases of NUMCOEF=2, 3, or 4, as shown in FIG. 25a. (The case of NUMCOEF=1 need not be signaled. If the coefficient is an ISL, the ISLONLY=TRUE case applies. If the coefficient is an SL, no RUNISL1 is possible.) The VLC table for NUMCOEF<=4 contains three zones, corresponding to NUMCOEF=2, 3, or 4, and is used by both inter and intra blocks.

For NUMCOEF>4, one set of VLC tables is shared by all of the 8×8, 8×4, 4×8, and 4×4 inter block modes. It is partitioned into 9 zones, depending on the value of NUMCOEF. The numbers of NUMCOEFs in zones are:

ZoneHeight_RUNISL1[9]={1, 1, 1, 1, 1, 2, 4, 4, 45}.

Since this set of tables is for NUMCOEF>4, the first zone is for NUMCOEF=5, the sixth zone is for NUMCOEF=10 and 11, etc. In general, the size of the symbol set for the $n^{th}$ zone is ZoneLimit_RUNISL1[n]+1, where ZoneLimit_RUNISL1[n] is the maximum NUMCOEF in the zone. The number of values for the last two zones is limited to be 16, however, and the last symbol is used as the escape symbol for RUNISL1>=15. In this case, the next 6 bits are used as a FLC to decode RUNISL1. FIG. 25b shows pseudocode (2510) for decoding RUNISL1 for inter blocks according to the first combined implementation.

The VLC table for intra block RUNISL1 is partitioned into 6 zones for NUMCOEF>4. The numbers of NUMCOEFs in the six zones are:

ZoneHeight_RUNISL1_Intra[6]={1, 1, 2, 4, 12, 39}.

The number of symbols in the last zone is limited to be 34, and the last symbol is used as escape symbol. A five-bit FLC follows the escape symbol for RUNISL1>=33. FIG. 25c shows pseudocode (2520) for decoding RUNISL1 for intra blocks according to the first combined implementation.

2. Second Implementation

FIGS. 26a and 26b show pseudocode (2600, 2610) for decoding RUNISL1 for inter blocks and intra blocks, respectively, according to the second combined implementation. The VLC table for NUMCOEF<=4 contains three zones, corresponding to NUMCOEF=2, 3, or 4. (Again, no zone is needed for NUMCOEF=1.) The tables used by inter and intra blocks are given in FIGS. 26c and 26d, respectively.

When NUMCOEF>4, one set of VLC Tables is shared by the 8×8, 8×4, 4×8, and 4×4 inter block modes. It contains four contexts, and the context decision is the same as for NUMCOEF for the sequence. Each context is partitioned into 8 zones, depending on the value of NUMCOEF. The sizes of the eight zones are:

ZoneHeight_RUNISL1[8]={1, 1, 1, 1, 1, 2, 4, 49}.

Since this set of tables is for NUMCOEF>4, the first zone is designed for NUMCOEF=5, the sixth zone is for NUMCOEF=10 and 11, etc. The size of the symbol set for the $n^{th}$ Huffman zone is ZoneLimit_RUNISL1[n]+1, where ZoneLimit_RUNISL1[n] is the maximum allowed NUMCOEF in the zone.

When NUMCOEF>4 for intra blocks, there is one context in the VLC table for RUNISL1, which is partitioned into 6 zones depending on the value of NUMCOEF. The sizes of the six zones are:

ZoneHeight_RUNISL1_Intra[6]={1, 1, 2, 4, 12, 39}.

F. Decoding Level Layer—NUMSL

The next symbol to be decoded is the number of SLs ["NUMSL"] in the sequence. Once NUMCOEF and RUNISL1 are known, the maximum possible NUMSL is NUMCOEF−RUNISL1. This maximum value is used to select a Huffman table to decode NUMSL. NUMSL is not coded if RUNISL1=NUMCOEF, since all coefficients are ISLs in that case. The range for signaled NUMSL is 1 to NUMCOEF−RUNISL1.

1. First Implementation

For decoding NUMSL for inter blocks, one set of VLC tables is shared by all inter block modes. It contains three contexts. The context decision is based on NUMCOEF, and the thresholds are shown in FIG. 27a. A NUMSL is decoded by context n if: NUMCOEF>ContextThresholds_NUMSL[n−1] and NUMCOEF<=ContextThresholds_NUMSL[n]. Each context is divided into 8 zones, depending on NUMCOEF−RUNISL1. The sizes of zones within each context are shown in FIG. 27b. For example, the first zone in the first context corresponds to NUMCOEF−RUNISL1=1. All block size modes use the same definition of zones. Therefore, for 4×4 mode, the effective numbers of zones are 8, 7 and 5 in the three contexts.

FIG. 27c shows pseudocode (2720) for decoding NUMSL for inter blocks. The first symbol in the Huffman table for NUMSL indicates NUMSL=1 and the SL's absolute value is two. In this case, the position of this SL in the level parts is computed from NUMCOEF and RUNISL1, and all levels before this SL are ISLs. Therefore, in this case, VALSL and RUNSL are skipped and the signs of the levels are decoded next. The second symbol in the Huffman table (index=1) indicates that NUMSL=1 and the SL's absolute value is greater than 2. For index=2 to 32, NUMSL is the index. To reduce table size, the Huffman table only covers up to NUMSL=32. Five-bit FLC-based escape coding is applied when NUMSL>=33.

For decoding NUMSL for intra blocks, the VLC table has only one context, which is divided into 8 zones. The sizes of all zones are:

ZoneHeight_NUMSL_Intra[8]={1, 2, 4, 4, 4, 8, 8, 32}.

FIG. 27d shows pseudocode (2730) for decoding NUMSL for intra blocks. The first symbol in each zone again indicates a single SL having a value of 2. No escape coding is used.

2. Second Implementation

The second combined implementation is similar to the first in many respects. For decoding NUMSL for inter blocks, one VLC table is shared by all inter block modes, and the table contains three contexts. The context decision is based on NUMCOEF, and the thresholds are shown in FIG. 27a. Each context is divided into 8 zones with widths as shown in FIG. 27b, but the context is determined based upon NUMCOEF. All block size modes use the same definition of zones.

The process for decoding NUMSL for inter blocks is similar to the process shown in the pseudocode (2720) of FIG. 27c, but there are a few differences. The zone selection decision is based upon NUMCOEF (as opposed to NUMCOEF−RUNISL1). No escape coding is used. Instead, the size of the symbol set for the $n^{th}$ NUMSL Huffman zone is ZoneLimit_NUMSL[n]+1, where ZoneLimit_NUMSL[n] is the maximum allowed NUMCOEF in the zone. The second symbol (index=1) indicates that NUMSL=1 and the SL's absolute value is greater than 2. For index=2 to ZoneLimit_NUMSL[n], the decoded NUMSL=index.

For decoding NUMSL for intra blocks, the VLC table has only one context, which is divided into 8 zones as shown in the first implementation. The process for decoding NUMSL for intra blocks is similar to the process shown in the pseudocode (2730) of FIG. 27d, but the zone selection decision is based upon NUMCOEF (as opposed to NUMCOEF−RUNISL1).

G. Decoding Level Layer—VALSL

After decoding NUMSL, the value of each SL ["VALSL"] and the number of ISLs ["RUNISL"] before that SL are decoded. This is the core of the second-layer run level description for the level parts of the first layer. The decoding proceeds from back to front, from high frequency coefficients to low frequency coefficients. The minimum absolute value for SLs is 2, since a level with an absolute value of 1 is an ISL.

1. First Implementation

There are two sets of VLC tables for VALSL, one for inter blocks and one for intra blocks. Each set contains 4 zones. FIG. 28 shows pseudocode (2800) for decoding VALSL according to the first combined implementation.

The decoder starts from LevelZone=0 for a block. A threshold LevelThreshold is maintained, which is initialized to 3 for 8×8 blocks and 2 for other blocks. LevelZone is increased by one if a decoded VALSL is greater than the current threshold and the highest zone has not yet been reached. LevelThreshold is doubled in this case. The Huffman table for each zone contains 31 symbols. Indices 0 to 29 are for level values 2 to 31, and index 30 is an escape code. The absolute value of a SL is:

$$x = q*32 + r,$$

where r is index+2 for 2<=r<32. For 2<=x<=31, only the code for the index is present in the bitstream, and q is 0. Otherwise, three symbols are present in the bitstream, the escape symbol, the scale q, and the remainder r. The last symbol in each Huffman table is the escape symbol. For escape-coded values, q is encoded as q-1 zeros and a one, and the value of r is signaled with a five-bit FLC.

When NUMSL=1 and SingleTwoFound is FALSE, the minimum VALSL is 3. To improve coding efficiency, the first VALSL is down-shifted by 1 at the encoder before encoding in this case. The decoder increases the first VALSL by one to get the correct value. The decoder tracks this with ShiftLevel initialized to TRUE if NUMSL=1 and SingleTwoFound=FALSE.

2. Second Implementation

The second combined implementation is similar to the first in many respects. Again, there are two sets of VLC tables for VALSL, one for inter blocks and one for intra blocks, and each set contains 4 zones. The zone threshold and adjustment mechanism is the same. Instead of 31 symbols, however, the Huffman table for each zone contains 30 symbols, and the absolute value of a SL is:

$$x = q*31 + r,$$

where r is index+2 for 2<=r<31. For escape-coded values, q is encoded as q-1 zeros and a one, and the value of r is signaled with the same table as non-escape values.

H. Decoding Level Layer—RUNISL

The number of ISLs up to the last SL in a sequence is given by NUMCOEF−RUNISL1−NUMSL. To reconstruct the level parts, the number of ISLs ["RUNISL"] before each SL is decoded after a VALSL for the SL. The decoder tracks the number of remaining ISLs, denoted as ISLLeft, which is initialized to be NUMCOEF−RUNISL1−NUMSL. The value of ISLLeft is updated after the decoding of each RUNISL, with ISLLeft=ISLLeft−RUNISL. No further decoding of RUNISL is needed when all ISLs have been decoded (IS-LLeft=0). In this case, VALSLs are decoded for remaining levels, which are SLs. Moreover, no further decoding of RUNISL is needed when all SLs have been decoded, since all remaining coefficients are ISLs.

1. First Implementation

The VLC table for RUNISL for inter blocks contains 3 contexts. The context thresholds are the same as for NUMSL, and the context again depends on NUMCOEF. Each context is divided into 9 zones. A zone is selected based upon ISLLeft, since the possible RUNISL values range from 0 to ISLLeft. The zone sizes are:

ZoneHeight_RUNISL[9]={1, 1, 1, 1, 1, 1, 2, 4, 51}.

In general, the number of symbols in the $n^{th}$ zone is Zone-Limit_RUNISL [n]+1, where ZoneLimit_RUNISL [n] is the maximum possible ISLLeft in each zone. To reduce table size, however, the number of symbols in the last zone is 33. Five-bit FLC-based escape coding is applied when RUNISL>=32. FIG. 29a shows pseudocode (2900) for decoding RUNISL for inter blocks.

The VLC table for intra blocks has one context. It is divided into 9 zones, where the zone sizes are:

ZoneHeight_RUNISL_Intra[9]={1, 1, 1, 1, 1, 1, 2, 4, 50}.

Again, the last zone is limited to 33 symbols. Five-bit FLC-based escape coding is applied when RUNISL>=32. FIG. 29b shows pseudocode (2910) for decoding RUNISL for intra blocks.

2. Second Implementation

The second combined implementation is similar to the first in many respects, but uses a code for each possible RUNISL value in the last zone, rather than escape coding.

I. Decoding Level Layer—SIGN

The last part of the level layer (1120) is the signs of all non-zero coefficients. Each sign is represented by one bit, 0 for positive and 1 for negative. The signs are decoded backwards, from high frequency coefficients to low frequency coefficients. If NUMCOEF indicates that all coefficients of the current block are ISLs, the level layer (1120) contains only the signs of these coefficients.

J. Decoding Run Layer—Overall

FIG. 30 shows pseudocode (3000) for an overall run layer decoding process. Run parts are not present if NUMCOEF=1, since in that case NUMZERO gives the number of zeros before the single non-zero coefficient. Otherwise, the decoder decodes the number of SRs ["NUMSR"], followed by the value of the SR ["VALSR"] for all SRs, and then the number of ISRs ["RUNISR"] before each SR.

The VALSRs are decoded back to front, since run values at the end of the run parts generally have larger values than run values at the front. Back-to-front decoding can reduce the symbol set quickly and provide additional opportunities for early termination. Based on the same rationale, RUNISRs are decoded from front to back, to exploit the fact that most ISRs are at the beginning of the run parts.

K. Decoding Run Layer—NUMSR

The first symbol in the run layer is NUMSR, if NUMZ-ERO>1. NUMSR is not present when NUMZERO=1, as NUMSR=1 in that case. For a block of size N, the upper bound for NUMSR is the "floor" of N/2 (i.e., the rounded off integer value of N/2), since at least one non-zero coefficient separates SR values. In terms of previous parameters, the largest possible NUMSR ["MaxNUMSR"] is min(NUM-COEF, NUMZERO). MaxNUMSR is used to choose the Huffman zone to decode NUMSR.

1. First Implementation

The VLC table for NUMSR for inter blocks has 3 contexts, based on NUMZERO. FIG. 31a shows thresholds (3100) for NUMSR for inter blocks. A NUMSR is decoded by context n if NUMZERO>ContextThresholds_NUMSR[n−1], and NUMZERO<=ContextThresholds_NUMSR[n]. Each context is divided into 10 zones. The sizes of the zones are:

ZoneHeight_NUMSR[10]={1, 1, 1, 1, 1, 1, 1, 4, 8, 12}, where the first zone corresponds to MaxNUMSR=2, the second zone corresponds to MaxNUMSR=3, etc. In general, the number of symbols in the $n^{th}$ zone is ZoneLimit_NUMSR[n], where ZoneLimit_NUMSR[n] is the maximum possible MaxNUMSR in the zone. The symbols in the zone correspond to the range of NUMSR=1 to ZoneLimit_NUMSR[n]. FIG. 31b shows pseudocode (3110) for decoding NUMSR for inter blocks.

The table for intra block NUMSR has two contexts, also depending on NUMZERO. The context threshold is 24. The first context is used if NUMZERO<=24, otherwise the second context is used. Each context is divided into seven zones, based on the value of MaxNUMSR. The sizes of the zones are:

ZoneHeight_NUMSR_Intra[7]={1, 1, 1, 2, 4, 8, 13}.

FIG. 31c shows pseudocode (3120) for decoding NUMSR for intra blocks.

2. Second Implementation

The second combined implementation is the same as the first implementation in the above-described respects.

L. Decoding Run Layer—VALSR

The VALSRs are decoded from back to front in the sequence. Before decoding each VALSR, the decoder computes MaxVALSR. MaxVALSR is the maximum possible value for the VALSR, which is used to select a Huffman table for decoding the VALSR. The value of MaxVALSR depends on the sum of the remaining SRs ["SRSumLeft"] and the number of SRs left ["SRLeft"]:

MaxVALSR=SRSumLeft−(SRLeft−1).

The maximum VALSR can only be obtained when all but one of the remaining SRs equal 1. For example, if NUMZ-ERO=50 and NUMSR is 32, VALSR=19 is the maximum possible at the start, since in that case every other SR=1.

1. First Implementation

After decoding a VALSR, SRSumLeft is decreased by VALSR, MaxVALSR is updated to be MaxVALSR−(VALSR−1), and SRLeft is reduced by 1. The decoding of VALSRs terminates when SRLeft=1 or SRSumLeft=SRLeft. In the first case, the value of the next VALSR is SRSumLeft. In the second case, all remaining SRs=1.

The VLC table for VALSR for inter blocks has 3 contexts, depending on NUMCOEF. FIG. 32a shows context thresholds (3200) for VALSR for inter blocks. A VALSR is decoded by context n if NUMCOEF>ContextThresholds_VALSR[n−1] and NUMCOEF<=ContextThresholds_VALSR[n]. Each context is divided into 11 zones, according to the value of MaxVALSR. For all contexts, the sizes of zones are:

ZoneHeight_VALSR[11]={1, 1, 1, 1, 2, 2, 2, 2, 8, 11, 30}.

To reduce the table size, the number of symbols in the last zone is limited to 33. Five-bit FLC-based escape coding is used when VALSR>=33. FIG. 32*b* shows pseudocode (3210) for decoding VALSR for inter blocks.

The table for intra block VALSR has two contexts, depending on NUMCOEF, and the context threshold is 8. The first context is used if NUMCOEF<=8, otherwise the second context is used. Each context is divided into 9 zones, based on the value of MaxVALSR. The sizes of the zones are:

ZoneHeight_VALSR_Intra[9]={1, 1, 1, 1, 2, 4, 4, 8, 38}.

The number of symbols in the last zone is limited to 33. Five-bit FLC-based escape coding is used when VALSR>=33. The decoding process is as shown in the pseudocode (3210) of FIG. 32*b*.

2. Second Implementation

The second implementation is similar to the first implementation in many respects. FIG. 33 shows pseudocode (3300) for decoding VALSR according to the second implementation. The initial value of SRSumLeft is NUMZERO, and no escape coding is used for high values of VALSR. The VLC table for VALSR for inter blocks has 3 contexts, as in the first implementation. Each context is divided into 11 zones, based on the value of MaxVALSR. For all contexts, the sizes of the zones are:

ZoneHeight_VALSR[11]={1, 1, 1, 1, 2, 2, 2, 2, 8, 14, 27}.

The table for intra block VALSR has two contexts, and each context is divided into 9 zones based on the value of MaxVALSR, as in the first implementation.

M. Decoding Run Layer—RUNISR

RUNISRs are decoded from front to back for the sequence, if NUMCOEF−NUMSR>0. The decoder tracks the number of ISRs left ["ISRLeft"], which is initialized to be NUMCOEF−NUMSR. ISRLeft is used to select an appropriate Huffman zone. After decoding each RUNISR, ISRLeft is decreased by RUNISR. The decoding stops when ISRLeft=0 or the RUNISRs before all SRs have been decoded.

1. First Implementation

The VLC table for RUNISR has 3 contexts, based on the value of NUMZERO. FIG. 34*a* shows context thresholds (3400) for RUNISR for inter blocks. A RUNISR is decoded by context n if NUMZERO>ContextThresholds_RUNISR[n−1] and NUMZERO<=ContextThresholds_RUNISR[n]. Each context is divided into 9 zones, based on the value of ISRLeft. The sizes of the zones are:

ZoneHeight_RUNISR[9]={1, 1, 1, 1, 1, 2, 4, 8, 43}.

The number of symbols in the last zone of each context is limited to 33. Five-bit FLC-based escape coding is used when RUNISR>=32. FIG. 34 shows pseudocode (3410) for decoding RUNISR for inter blocks.

The table for intra block RUNISR has two contexts, depending on NUMZERO, and the context threshold is 24. The first context is used if NUMZERO<=24, otherwise the second context is used. Each context is divided into 7 zones, based on the value of ISRLeft. The sizes of zones are:

ZoneHeight_RUNISR_Intra[7]={1, 1, 1, 1, 4, 8, 45}.

The number of symbols in the last zone of each context is limited to 33. Five-bit FLC-based escape coding is used when RUNISR>=32. The decoding process is as shown in the pseudocode (3410) of FIG. 34*b*.

2. Second Implementation

The second implementation is similar to the first implementation in many respects. FIG. 35 shows pseudocode (3500) for decoding RUNISR according to the second implementation. No escape coding is used for high values of RUNISR. The VLC table for VALSR for inter blocks has 3 contexts depending on the value of NUMZERO, and each context is divided into 9 zones depending on the value of ISRLeft, as in the first implementation. The table for intra block RUNISR has two contexts, and each context is divided into 7 zones based on the value of ISRLeft, as in the first implementation.

VIII. Zigzag Scanning Tables

In some embodiments, a codec uses different zigzag scan patterns for different sizes of blocks and for progressive and interlaced content. The resulting one-dimensional sequences have similar probability distributions for progressive and interlaced content. 8×4 and 4×8 blocks are zigzag scanned with different scan patterns so that the one-dimensional output has roughly the same probability distribution for 4×8 and 8×4 blocks. This enables the codec, for example, to use the same sets of Huffman codes for 4×4, 8×4, 4×8, and 8×8 blocks, for progressive or interlaced content.

The different zigzag scan patterns for interlaced and progressive content may be used in conjunction with multi-layer run level encoding and decoding. Or, the different zigzag scan patterns for interlaced and progressive content may be used in conjunction with other kinds of entropy encoding and decoding, for example, 3-D run/level/last coding and decoding.

Figure 36H:
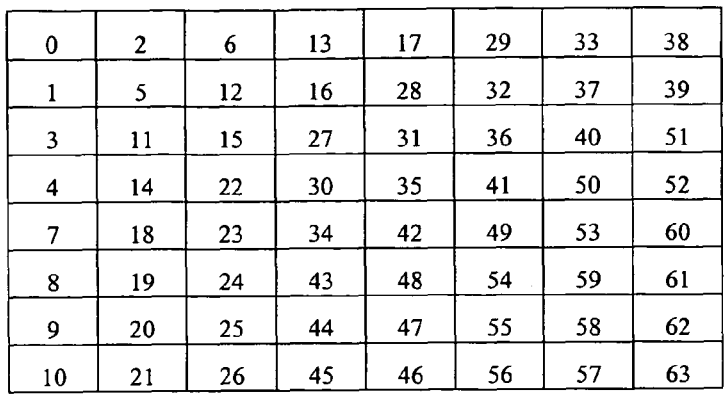
Figure 36I:
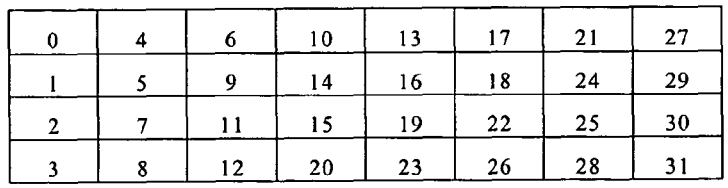
Figure 36J:
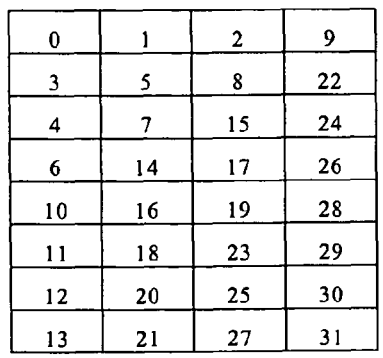
Figure 36K:
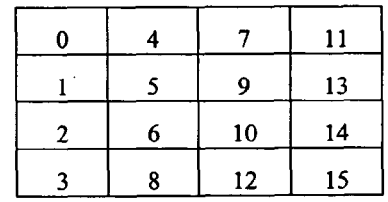

FIGS. 36*a* through 36*c* show different scan patterns for intra blocks, depending on direction of DC coefficient prediction. FIGS. 36*d* through 36*k* show zigzag scan patterns for different inter block sizes for progressive and interlaced content. Alternatively, the codec uses the same zigzag scan patterns for progressive and interlaced content.

IX. Alternatives

While the techniques and tools described herein may be implemented in combination as described in section VII, they may also be implemented separately, and various constraints can be relaxed in direct extensions of the techniques and tools. The following list is indicative of these extensions, but is by no means exhaustive:

(1) Two-layer run level coding and decoding can be generalized to a recursive scheme with more than two layers of run level coding and decoding.

(2) In coding NUMCOEF, two Huffman tables can be used, one for ISL-only sequences and one for other sequences. A one-bit flag can be used to signal whether the current sequence is ISL-only, which is used to select the corresponding Huffman table to decode NUMCOEF. More ISL-only sequences can be covered in this way, compared to signaling of ISL-only sequences only for lower values of NUMCOEF.

(3) The coding of RUNISL1 can be replaced by coding the total number of ISLs up to the last SL.

(4) NUMSL can be removed. The codec loops, coding or decoding a VALSL and a RUNISL before it (as separate codes or pairs), until all levels have been coded.

(5) NUMSR can be removed. The codec codes/decodes VALSRs for all SRs first, followed by the RUNISRs before each SR. The end of VALSR sequence can be determined when NUMZERO is known.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In a computing device that implements a video encoder, a method comprising:

with the computing device that implements the video encoder, encoding one or more video images, including processing run-level information in a two-layer representation for a sequence of values for the one or more video images, wherein the processing includes:
  run-level encoding the sequence of values as a sequence of plural first-layer run-level pairs that include plural first-layer runs and plural first-layer levels; and
  run-level encoding a sequence of the plural first-layer runs as a sequence of one or more second-layer run-level pairs, wherein each of the one or more second-layer run-level pairs includes a second-layer run and a second-layer level, the second-layer run representing a count of consecutive first-layer runs classified as having an insignificant run value, and the second-layer level representing a single adjacent first-layer run classified as having a significant run value; and
from the computing device that implements the video encoder, outputting a result of the encoding the one or more video images.

2. The method of claim 1 wherein the values are frequency transform coefficients.

3. The method of claim 2 wherein the sequence of values is zigzag scanned using a scan pattern selected from among plural available scan patterns for variable-size blocks.

4. The method of claim wherein each of the plural first-layer runs represents a run of zero or more zero values in the sequence of values.

5. The method of claim 1 wherein the count of consecutive first-layer runs is a count of first-layer runs with run value of zero.

6. The method of claim 1 wherein the single first-layer run with the significant run value has a run value higher than zero.

7. The method of claim 1 further including processing the second-layer run using a separate Huffman code per second-layer run.

8. The method of claim 1 further including processing the second-layer level using a separate Huffman code per second-layer level.

9. The method of claim 1 further including processing a count of significant second-layer runs, wherein the count of significant second-layer runs at least in part enables reduction in code table size and/or early termination of decoding.

10. The method of claim 1 wherein the processing includes using embedded Huffman code tables for the information in the two-layer representation, and wherein the embedded Huffman code tables are shared for plural different variable-size blocks.

11. The method of claim 1 wherein the processing includes using zoned Huffman code tables for the information in the two-layer representation.

12. The method of claim 1 wherein the outputting the result comprises signaling the encoded run-level information as part of a bit stream.

13. In a computing device that implements a video decoder, a method comprising:

with the computing device that implements the video decoder, decoding one or more video images, including, for each of plural sequences of frequency transform coefficients for the one or more video images, processing run-level information for the sequence in a two-layer representation, including:
  run-level decoding a sequence of one or more second-layer run-level pairs that represent a sequence of plural first-layer runs, wherein each of the one or more second-layer run-level pairs includes a second-layer run and a second-layer levels, the second-layer run representing a count of consecutive first-layer runs classified as having an insignificant run value, and the second-layer level representing a single adjacent first-layer run classified as having a significant run value; and
  run-level decoding the plural first-layer runs and plural first-layer levels to reconstruct the sequence of frequency transform coefficients; and
from the computing device that implements the video decoder, outputting a result of the decoding the one or more video images.

14. The method of claim 13 wherein each of the plural first-layer runs represents a run of zero or more zero values in the sequence.

15. The method of claim 13 wherein the count of consecutive first-layer runs is a count of first-layer runs with run value of zero.

16. The method of claim 13 wherein the single first-layer run with the significant run value has a run value higher than zero.

17. The method of claim 13 wherein the outputting the result comprises outputting for display one or more video pictures reconstructed based at least in part upon the plural sequences of frequency transform coefficients.

18. In a computing device that implements a video encoder, a method comprising:

with the computing device that implements the video encoder, encoding one or more video images, including, for each of plural sequences of frequency transform coefficients for the one or more video images, processing run-level information for the sequence in a two-layer representation, including:
  run-level encoding the sequence of frequency transform coefficients as a sequence of plural first-layer run-level pairs that include plural first-layer runs and plural first-layer levels; and
  run-level encoding a sequence of the plural first-layer levels as a sequence of one or more second-layer run-level pairs, wherein each of the one or more second-layer run-level pairs includes a second-layer run and a second-layer level, the second-layer run representing a count of consecutive first-layer levels classified as having an insignificant level value, and the second-layer level representing a single adjacent first-layer level classified as having a significant level value; and
from the computing device that implements the video encoder, outputting a result of the encoding the one or more video images.

19. The method of claim 18 wherein each of the plural first-layer levels represents a non-zero value in the sequence.

20. The method of claim 18 wherein the count of consecutive first-layer levels is a count of first-layer levels with an absolute value of one.

21. The method of claim 18 wherein the single first-layer level with the significant level value has an absolute value of two or more.

22. The method of claim 18 wherein the outputting the result comprises signaling encoded run-level information as part of a bit stream.

23. In a computing device that implements a video decoder, a method comprising:
with the computing device that implements the video decoder, decoding one or more video images, including processing run-level information in a two-layer representation for a sequence of values for the one or more video images, wherein the processing includes:
run-level decoding a sequence of one or more second-layer run-level pairs that represent a sequence of plural first-layer levels, wherein each of the one or more second-layer run-level pairs includes a second-layer run and a second-layer level, the second-layer run representing a count of consecutive first-layer levels classified as having an insignificant level value, and the second-layer level representing a single adjacent first-layer level classified as having a significant level value; and
run-level decoding plural first-layer runs and the plural first-layer levels to reconstruct the sequence of values; and
from the computing device that implements the video decoder, outputting a result of the decoding the one or more video images.

24. The method of claim 23 wherein each of the plural first-layer levels represents a non-zero value in the sequence of values.

25. The method of claim 23 wherein the count of consecutive first-layer levels is a count of first-layer levels with an absolute value of one.

26. The method of claim 23 wherein the single first-layer level with the significant level value has an absolute value of two or more.

27. The method of claim 23 further including processing the second-layer run using a separate Huffman code per second-layer run.

28. The method of claim 23 further including processing the second-layer level using a separate Huffman code per second-layer level.

29. The method of claim 23 further including processing a count of significant second-layer levels, wherein the count of significant second-layer levels at least in part enables reduction in code table size and/or early termination of decoding.

30. The method of claim 23 wherein the outputting the result comprises outputting for display one or more video pictures reconstructed based at least in part upon the sequence of values.

31. One or more computer-readable memory storage media storing computer-executable instructions for causing a computing device implementing a video encoder programmed thereby to perform a method for encoding video, the method comprising:
with the computing device that implements the video encoder, encoding one or more video images, including processing run-level information in a two-layer representation for a sequence of values for the one or more video images, wherein the processing includes:
run-level encoding the sequence of values as a sequence of plural first-layer run-level pairs that include plural first-layer runs and plural first-layer levels; and
run-level encoding a sequence of the plural first-layer runs as a sequence of one or more second-layer run-level pairs, wherein each of the one or more second-layer run-level pairs includes a second-layer run and a second-layer level, the second-layer run representing a count of consecutive first-layer runs classified as having an insignificant run value, and the second-layer level representing a single adjacent first-layer run classified as having a significant run value; and
from the computing device that implements the video encoder, outputting a result of the encoding the one or more video images.

32. The computer-readable memory storage media of claim 31 wherein each of the plural first-layer runs represents a run of zero or more zero values in the sequence of values.

33. The computer-readable memory storage media of claim 31 wherein the count of consecutive first-layer runs is a count of first-layer runs with run value of zero.

34. The computer-readable memory storage media of claim 31 wherein the single first-layer run with the significant run value has a run value higher than zero.

35. The computer-readable memory storage media of claim 31 wherein the method further includes processing the second-layer run using a separate Huffman code per second-layer run.

36. The computer-readable memory storage media of claim 31 wherein the method further includes processing the second-layer level using a separate Huffman code per second-layer level.

37. The computer-readable memory storage media of claim 31 wherein the method further includes processing a count of significant second-layer runs, wherein the count of significant second-layer runs at least in part enables reduction in code table size and/or early termination of decoding.

38. One or more computer-readable memory storage media storing computer-executable instructions for causing a computing device that implements a video decoder programmed thereby to perform a method for decoding video, the method comprising:
with the computing device that implements the video decoder, decoding one or more video images, including, for each of plural sequences of frequency transform coefficients for the one or more video images, processing run-level information for the sequence in a two-layer representation, including:
run-level decoding a sequence of one or more second-layer run-level pairs that represent a sequence of plural first-layer runs, wherein each of the one or more second-layer run-level pairs includes a second-layer run and a second-layer levels, the second-layer run representing a count of consecutive first-layer runs classified as having an insignificant run value, and the second-layer level representing a single adjacent first-layer run classified as having a significant run value; and
run-level decoding the plural first-layer runs and plural first-layer levels to reconstruct the sequence of frequency transform coefficients; and
from the computing device that implements the video decoder, outputting a result of the decoding the one or more video images.

39. The computer-readable memory storage media of claim 38 wherein each of the plural first-layer runs represents a run of zero or more zero values in the sequence.

40. The computer-readable memory storage media of claim 38 wherein the count of consecutive first-layer runs is a count of first-layer runs with run value of zero.

41. The computer-readable memory storage media of claim 38 wherein the single first-layer run with the significant run value run has a run value higher than zero.

42. One or more computer-readable memory storage media storing computer-executable instructions for causing a computing device that implements a video encoder programmed thereby to perform a method for encoding video, the method comprising:

with the computing device that implements the video encoder, encoding one or more video images, including, for each of plural sequences of frequency transform coefficients for the one or more video images, processing run-level information for the sequence in a two-layer representation, including;

run-level encoding the sequence of frequency transform coefficients as a sequence of plural first-layer run-level pairs that include plural first-layer runs and plural first-layer levels; and run-level encoding a sequence of the plural first-layer levels as a sequence of one or more second-layer run-level pairs, wherein each of the one or more second-lever run-level pairs includes a second-layer run and a second-layer level, the second-layer run representing a count of consecutive first-layer levels classified as having an insignificant level value, and the second-layer level representing a single adjacent first-layer level classified as having a significant level value; and from the computing device that implements the video encoder, outputting a result of the encoding the one or more video images.

43. The computer-readable memory storage media of claim 42 wherein each of the plural first-layer levels represents a non-zero value in the sequence.

44. The computer-readable memory storage media of claim 42 wherein the count of consecutive first-layer levels is a count of first-layer levels with an absolute value of one.

45. The computer-readable memory storage media of claim 42 wherein the single first-layer level with the significant level value has an absolute value of two or more.

46. One or more computer-readable memory storage media storing computer-executable instructions for causing a computing device that implements a video decoder programmed thereby to perform a method for decoding video, the method comprising:

with the computing device that implements the video decoder, decoding one or more video images, including processing run-level information in a two-layer representation for a sequence of values for the one or more video images, wherein the processing includes:

run-level decoding a sequence of one or more second-layer run-level pairs that represent a sequence of plural first-layer levels, wherein each of the one or more second-layer run-level pairs includes a second-layer run and a second-layer level, the second-layer run representing a count of consecutive first-layer levels classified as having an insignificant level value, and the second-layer level representing a single adjacent first-layer level classified as having a significant level value; and run-level decoding plural first-layer runs and the plural first-layer levels to reconstruct the sequence of values; and from the computing device that implements the video decoder, outputting a result of the decoding the one or more video images.

47. The computer-readable memory storage media of claim 46 wherein each of the plural first-layer levels represents a non-zero value in the sequence of values.

48. The computer-readable memory storage media of claim 46 wherein the count of consecutive first-layer levels is a count of first-layer levels with an absolute value of one.

49. The computer-readable memory storage media of claim 46 wherein the single first-layer level with the significant level value has an absolute value of two or more.

50. The computer-readable memory storage media of claim 46 wherein the method further includes processing the second-layer run using a separate Huffman code per second-layer run.

51. The computer-readable memory storage media of claim 46 wherein the method further includes processing the second-layer level using a separate Huffman code per second-layer level.

52. The computer-readable memory storage media of claim 46 wherein the method further includes processing a count of significant second-layer levels, wherein the count of significant second-layer levels at least in part enables reduction in code table size and/or early termination of decoding.

* * * * *

UNITED STATES PATENT AND TRADEMARK OFFICE
CERTIFICATE OF CORRECTION

| | | |
|---|---|---|
| PATENT NO. | : 7,724,827 B2 | Page 1 of 1 |
| APPLICATION NO. | : 10/826971 | |
| DATED | : May 25, 2010 | |
| INVENTOR(S) | : Jie Liang et al. | |

It is certified that error appears in the above-identified patent and that said Letters Patent is hereby corrected as shown below:

In column 20, line 4, before "1" insert -- 1 --.

In column 26, line 67, before "for" insert -- and 36 --.

In column 37, line 38, in Claim 4, delete "claim" and insert -- claim 1 --, therefor.

In column 41, line 14, in Claim 42, delete "including;" and insert -- including: --, therefor.

Signed and Sealed this
Fifteenth Day of February, 2011

David J. Kappos
*Director of the United States Patent and Trademark Office*